(12) United States Patent
Ide

(10) Patent No.: US 6,311,019 B1
(45) Date of Patent: Oct. 30, 2001

(54) AUTOMATIC FOCUS ADJUSTING SYSTEM CAPABLE OF ADJUSTING FOCUS OF MOVING SUBJECT

(75) Inventor: Masataka Ide, Hachioji (JP)

(73) Assignee: Olympus Optical Co., Ltd. (JP)

( * ) Notice: Subject to any disclaimer, the term of this patent is extended or adjusted under 35 U.S.C. 154(b) by 0 days.

(21) Appl. No.: 09/521,647

(22) Filed: Mar. 8, 2000

(30) Foreign Application Priority Data

Mar. 8, 1999 (JP) .................................................. 11-059997

(51) Int. Cl.⁷ .................................................... G03B 13/36
(52) U.S. Cl. .............................. 396/95; 396/104; 396/123
(58) Field of Search .............................. 396/95, 124, 121, 396/122, 123, 104, 89, 153, 128

(56) References Cited

U.S. PATENT DOCUMENTS

| | | | |
|---|---|---|---|
| 5,208,625 | 5/1993 | Suekane | 354/402 |
| 5,890,021 | * 3/1999 | Onoda | 396/121 |
| 5,913,082 | * 6/1999 | Onoda | 396/121 X |

* cited by examiner

Primary Examiner—W. B. Perkey
(74) Attorney, Agent, or Firm—Straub & Pokotylo; John C. Pokotylo

(57) ABSTRACT

An automatic focus adjusting apparatus includes an image move-amount detecting section, an image position predicting section and a control section. The image move-amount detecting section detects, for each of a pair of images of a subject divided in a predetermined direction, image positions of the subject in an image-divided direction and in a direction approximately orthogonal with this image-divided direction respectively on photoelectric conversion elements at mutually different first and second times respectively, and obtains move amounts of the images of the subject in the image-divided direction based on a result of this detection. The image position predicting section predicts an image position of the subject in an image-divided direction at a third time different from the first and second times, based on an output from the image move-amount detecting section. The control section carries out a focus adjustment so that the image of the subject is in focus at the third time, based on an output from the image position predicting section.

19 Claims, 15 Drawing Sheets

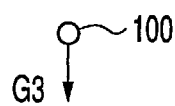
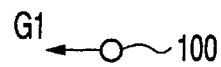
FIG. 12A  FIG. 12B
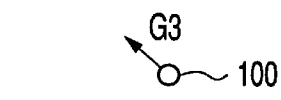
FIG. 12C  FIG. 12D
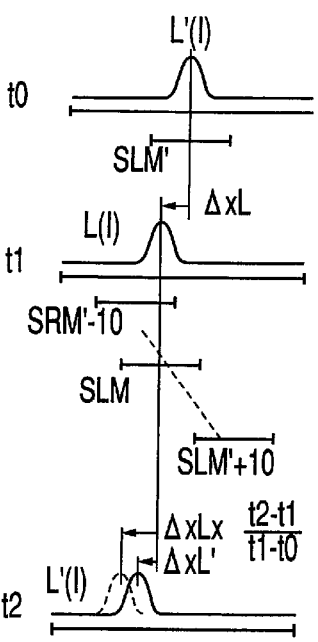
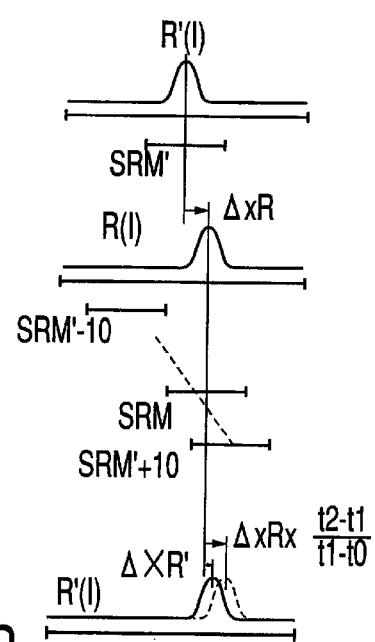
FIG. 13A  FIG. 13B

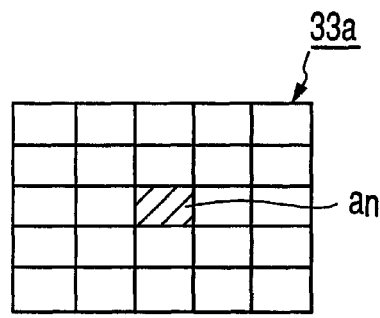
F I G. 16A
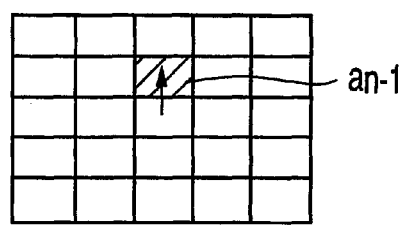
F I G. 16B
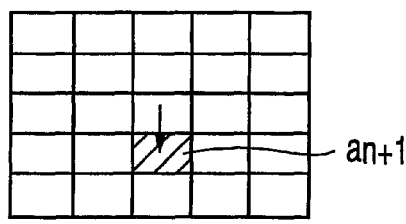
F I G. 16C
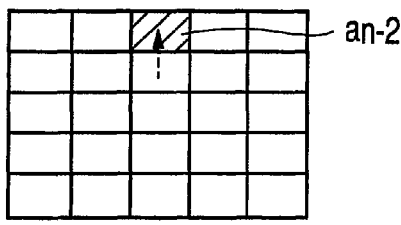
F I G. 16D
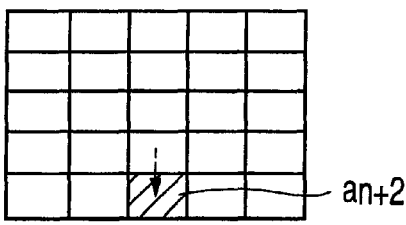
F I G. 16E

AUTOMATIC FOCUS ADJUSTING SYSTEM CAPABLE OF ADJUSTING FOCUS OF MOVING SUBJECT

CROSS-REFERENCE TO RELATED APPLICATION

This application is based upon and claims the benefit of priority from the prior Japanese Patent Application No. 11-059997, filed Mar. 8, 1999, the entire contents of which are incorporated herein by reference.

BACKGROUND OF THE INVENTION

The present invention relates to an automatic focus adjusting system that can be applied to a camera or the like, and relates, more particularly, to an automatic focus adjusting apparatus and an automatic focus adjusting method capable of adjusting a focus of a moving subject.

Among techniques developed in recent years for a focus adjusting of an optical apparatus, there has been disclosed in U.S. Pat. No. 5,208,625, for example, a technique for detecting a move of an image of an image picked-up subject on a line sensor in an example of an automatic focusing apparatus having a focus detector based on a TTL phase difference detecting system.

In a camera built in with such an automatic focusing apparatus, it is judged whether or not an image picked-up subject has moved during a predetermined period of time, based on an image picked-up position of the subject at a certain time and an image position of the subject after a lapse of the predetermined period of time. When it is judged that the subject has moved during this period, the focus of the moved subject is adjusted to a correct focus based on a speed at which the subject moved.

This focus adjustment is what is called a "moving body correction" that is carried out as follows. When a move speed of an image of the subject on the line sensor is higher than a speed of a predetermined value when the subject has moved, it is judged that the subject is a moving subject, that is a moving body. Then, an image screen position of the subject at the time of starting an exposure is predicted based on a release time lag.

According to the above-described prior-art automatic focus adjusting apparatus, however, an obtained image of the subject may have deviated from the line sensor, when the subject has moved up and down or when the camera has moved due to a touch on the camera by hand or the like.

Accordingly, there may be a low correlation between image positions of the subject during a predetermined period of time, and thus there arises a situation where it is not possible to accurately detect the moving body.

As a result, there may be a case where a moving body is regarded as a stationary body, and the image of the moving body is not focused completely, thus producing a blurred picture.

BRIEF SUMMARY OF THE INVENTION

It is an object of the present invention to provide an automatic focus adjusting apparatus capable of improving the precision of focus adjustment of a moving subject.

It is another object of the present invention to provide an automatic focus adjusting method capable of improving the precision of focus adjustment of a moving subject.

In order to achieve the above objects, according to one aspect of the present invention, there is provided an automatic focus adjusting apparatus comprising:

image move-amount detecting means for detecting, for each of a pair of images of a subject divided in a predetermined direction, image positions of the subject in an image-divided direction and in a direction approximately orthogonal with this image-divided direction respectively on photoelectric conversion elements at mutually different first and second times respectively, and for obtaining move amounts of the images of the subject in the image-divided direction based on a result of this detection;

image position predicting means for predicting an image position of the subject in an image-divided direction at a third time different from the first and second times, based on an output from the image move-amount detecting means; and control means for carrying out a focus adjustment so that the image of the subject is in focus at the third time, based on an output from the image position predicting means.

Further, according to another aspect of the invention, there is provided an automatic focus adjusting apparatus comprising:

photoelectric conversion means having, in at least a predetermined area, a plurality of light receiving elements in a two-dimensional array for receiving light beams respectively of a pair of images of a subject formed by a pair of light beams arrayed in a predetermined direction, from out of light beams of the subject;

two-image distance calculating means for calculating a distance between the pair of images of the subject, based on an output of the pair of images from the photoelectric conversion means;

predicting means for predicting a distance between the two images at a third time, based on two-image distances at a first time and a second time respectively, by repeatedly operating the two-image distance calculating means, wherein the first time, the second time and third time are different from each other;

control means for outputting a lens driving signal based on an output from the predicting means, when a predicted value based on a calculation by the two-image distance calculating means does not meet a predetermined condition and also when the predicted value meets the predetermined condition as a result of carrying out a signal processing again by the two-image distance calculating means based on a signal from a changed light-receiving area positioned in a direction approximately orthogonal with the pair of light beams arrayed in the predetermined direction in the photoelectric conversion means; and Lens-driving means for driving an image pickup lens to focus the subject at the third time based on a lens-driving signal from the control means.

Further, according to still another aspect of the invention, there is provided an automatic focus adjusting apparatus for adjusting a focus of an image pickup lens so as to focus an image of an image picked-up subject positioned in a detecting area in a predetermined longitudinal direction within a photographing screen, the automatic focus adjusting apparatus comprising:

predicting means for predicting by calculation based on a result of a repeated detection of a focus;

lens driving means for driving the image pickup lens based on a prediction so as to focus the subject at a certain point of time in future, according to a result of the predict calculation conducted by the predicting means; and control means for prohibiting the lens driving means from driving the image pickup lens based on a prediction when it is judged that there is a low level of reliability in the process of predict calculation by the predict calculating means, then for making the predict calculation means detect again the predict calculation by shifting the detection area to a direction approximately orthogonal with the longitudinal direction, and for making the lens driving means drive the image pickup lens when it is judged that there is a reasonable level of reliability in the focus detection.

Further, according to still another aspect of the invention, there is provided an automatic focus adjusting apparatus comprising:

image dividing means for dividing an image of an image picked-up subject into a pair of images;

first and second groups of photoelectric conversion elements for receiving respectively light beams of the pair of images divided by the image dividing means;

image move-amount detecting means for obtaining move amounts of images of the subject, for each of the pair of images divided by the image dividing means, based on image positions of the subject on the first and second groups of photoelectric conversion elements at mutually different first and second times;

detection area shifting means for shifting an image detection area of the subject detected by the image move-amount-detecting means, to a direction approximately orthogonal with a direction in which the image is divided;

image position predicting means for predicting positions of the images of the subject at a third time different from the first and second times, based on an output from the image move-amount detecting means; and lens-driving means for driving a lens based on an output from the image position predicting means.

Further, according to still another aspect of the invention, there is provided an automatic focus adjusting apparatus comprising:

an image dividing section for dividing an image of an image picked-up subject into a pair of images;

first and second groups of photoelectric conversion elements for receiving respectively light beams of the pair of images divided by the image dividing section;

an image move amount detecting section for obtaining a move of each of the pair of images of the subject divided by the image dividing section, based on image positions of the subject on the first and second groups of photoelectric conversion elements at mutually different first and second times;

a detection area shifting section for shifting an image detection area of the subject detected by the image move amount detecting section, to a direction approximately orthogonal with a direction in which the image is divided;

an image position predicting section for predicting positions of the images of the subject at a third time different from the first and second times, based on an output from the image move-amount detecting section; and a lens driving section for driving a lens based on an output from the image position predicting section.

Further, according to still another aspect of the invention, there is provided an automatic focus adjusting method comprising the steps of:

dividing an image of an image picked-up subject into a pair of images;

receiving light beams of the pair of divided images, by first and second groups of photoelectric conversion elements respectively;

obtaining a move amount of each of the pair of divided images of the subject, based on image positions of the subject on the first and second groups of photoelectric conversion elements at mutually different first and second times;

shifting an image detection area of the subject obtained in the step of obtaining image move amounts of the subject, to a direction approximately orthogonal with a direction in which the image is divided;

predicting positions of the images of the subject at a third time different from the first and second times, based on the image move amounts of the subject; and driving a lens based on an output of the predicted image positions of the subject.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 3A is an explanatory view that shows a structure of a focus detecting optical system (a phase difference detecting optical system) for guiding light beams from an image picked-up subject onto photoelectric conversions elements P's on an area sensor within a focus detector; and FIG. 3B is a perspective view of a phase difference detecting optical system thereof;

FIGS. 12A, 12B, 12C and 12D are views for showing the principles of a focus detection of a moving subject, based on a relationship between the subject, a camera and an area sensor; FIG. 12A is an explanatory view for showing a case where the subject is approaching directly toward the camera; FIG. 12B is an explanatory view for showing a case where the subject is moving to a direction orthogonal with an optical axis of the camera; FIG. 12C is an explanatory view for showing a case where the subject is approaching toward the left side front of the camera; and FIG. 12D is an explanatory view for showing a case where the subject is moving away from the camera to the left backward;

FIGS. 13A and 13B are explanatory views for showing a move of the subject;

FIGS. 16A, 16B, 16C, 16D and 16E are explanatory views for showing a method of shifting an area at the time of detecting image move amounts of the subject in a first embodiment of the present invention; FIGS. 16A, 16B, 16C, 16D and 16E explain a sequence of shifting the area;

FIGS. 17A and 17B explain positions of an image of the subject at times t0 and t1 respectively; and FIG. 17C and 17D explain positions of images of the subject at times t0 and t1;

FIGS. 19A, 19B, 19C, 19D and 19E explain a sequence of shifting the area.

DETAILED DESCRIPTION OF THE INVENTION

Figure 1:
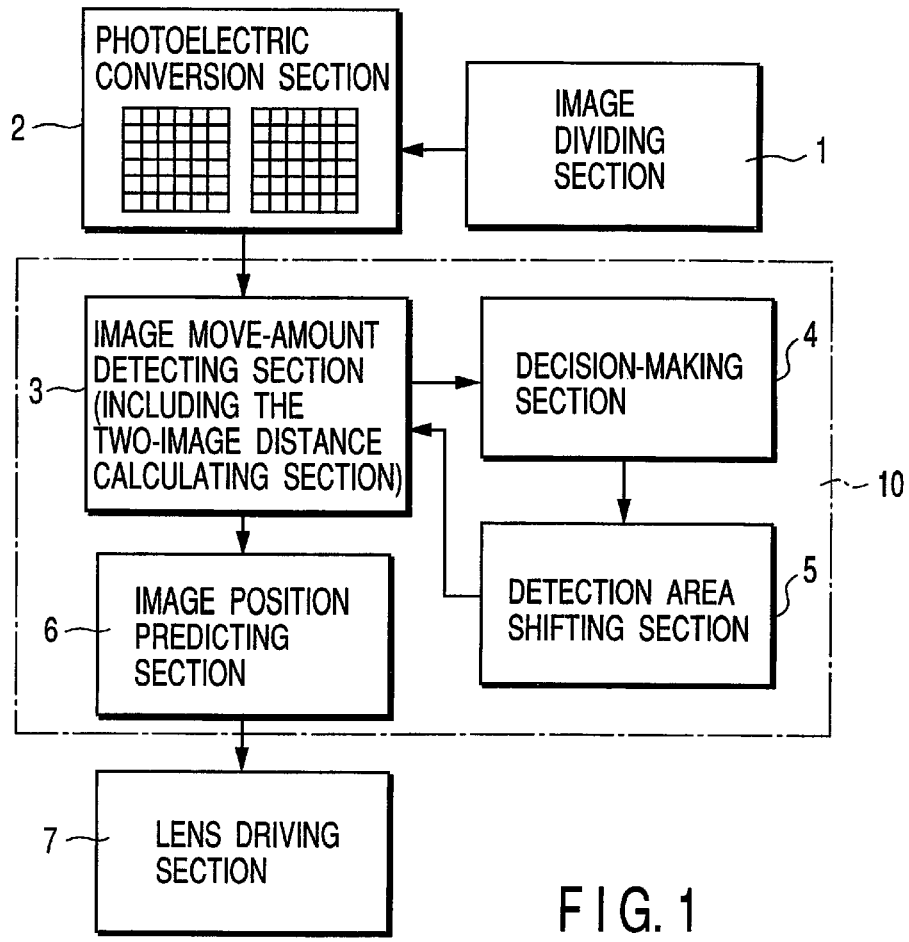
FIG. 1 is a block diagram for showing a basic structure relating to an automatic focus adjusting apparatus of the present invention.

Reference will now be made in detail to the presently preferred embodiments of the invention as illustrated in the accompanying drawings, in which like reference numerals designate like or corresponding parts.
(First Embodiment)

At first, a first embodiment relating to an automatic focus adjusting apparatus of the present invention will be explained with reference to FIG. 1 that shows a basic structure of the apparatus.

This automatic focus adjusting apparatus has the following structure.

The automatic focus adjusting apparatus is structured by: an image dividing section 1 for dividing an image of an image picked-up subject into two images; a photoelectric converting section 2 having first and second groups of photoelectric conversion elements for receiving the two divided images respectively; an image move-amount detecting section 3 for obtaining a move amount of each of the two divided images of the subject, based on image positions of the subject on each group of photoelectric conversion elements at mutually different first and second times; a judging section 4 for judging whether the image move-amount detecting section 3 can detect move amounts or not; a detection area shifting section 5 for giving information to shift a detection area of image move amounts to a direction approximately orthogonal with a direction in which the picked-up image is divided; an image position predicting section 6 for predicting image positions of the subject at a third time different from the first and second times, based on an output of the image move-amount detecting section 3; and a lens driving section 7 for driving a lens based on an output of the image position predicting section 6.

Each constituent element has the following operational characteristics.

The image move-amount detecting section 3 detects move amounts of each of the two images divided by the image dividing section 1, based on image positions of the subject on each group of photoelectric conversion elements of the photoelectric converting section 2 at the mutually different first and second times. In other words, the image move-amount detecting section 3 detects move amounts of the images in a direction in which the image is divided.

The judging section 4 judges whether the image move-amount detecting section 3 can detect move amounts or not, based on a predetermined algorithm. When the judging section 4 has judged that the image move-amount detecting section 3 cannot detect move amounts, the judging section 4 makes a detection area shifting section 5 to be described later operate, to set the next area as a detection area.

More specifically, the detection area shifting section 5 shifts the detection area to a direction approximately orthogonal with the image-divided direction.

Then, the image move-amount detecting section 3 detects again move amounts of the images in the detection area shifted to the direction approximately orthogonal with the image-divided direction, on the photoelectric conversion elements 2 at the mutually different first and second times, based on information on the detection area sent from the detection area shifting area 5.

The image position predicting section 6 predicts image positions of the subject at a third time different from the first and second times, based on an output from the image move-amount detecting section 3, after the detection area has been shifted by the detection area shifting section 5.

The lens driving section 7 conducts a focus adjustment by suitably driving the lens based on an output from the image position predicting section 6.

Figure 2:
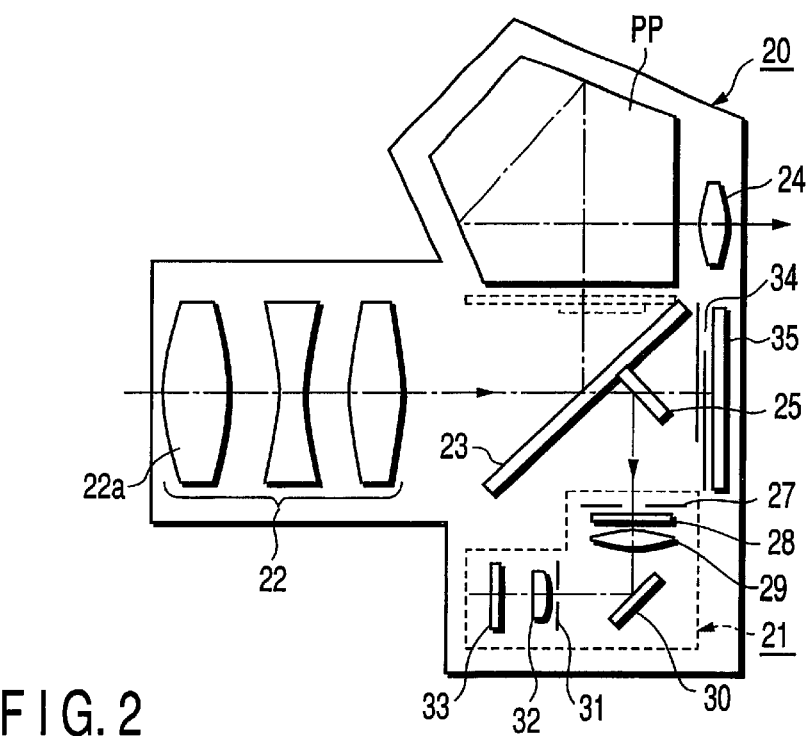
FIG. 2 is a cross-sectional view for showing an optical path of a single-lens reflex camera to which the automatic focus adjusting apparatus of the present invention is applied.

FIG. 2 shows a cross-sectional view of a single-lens reflex camera as a first embodiment in which the automatic focus adjusting apparatus of the present invention is applied in detail.

Main constituent elements of the camera will be explained along the optical path with reference to FIG. 2.

This type of camera is provided with a focus detector 21 for detecting a focus, at a lower part of a camera body 20.

A main mirror 23 is disposed in the camera body 20 so that light beams from the subject passed through an image pickup lens 22 are partially reflected upwards by this main mirror, with the rest of the beams transmitted through the main mirror 23 to proceed to a straight direction.

Accordingly, the light beams reflected by the main mirror 23 are guided to a finder 24 through a pentaprism PP, to enter an eye of an observer.

In the mean time, the light beams transmitted through the main mirror 23 are reflected downwards by a sub-mirror 25, and are guided to the focus detector 21.

This focus detector 21 is structured by a field-of-vision mask 27 for diaphragming the light beams passed through the image pickup lens 22, an infrared-beam cutting filter 28 for cutting infrared components, a condenser lens 29 for collecting light beams, a total-reflection mirror 30 for reflecting the total light beams, a pupil mask 31 for limiting the light beams, image re-forming lenses 32 for forming images again based on the light beams on the photoelectric conversion elements on an area sensor 33, and the area sensor 33 formed by the photoelectric conversion elements and a processing circuit therefor.

In the single-lens reflex camera having the above-described structure, at the time of picking up an image, for example, the main mirror 23 and the sub-mirror 25 are retracted at a position within a dotted-line area (that is, at a mirror-upped position), and the shutter 34 is kept open for a predetermined period of time. Then, an image is exposed on a film 35 positioned at the back of the shutter 34.

Thus, an image pickup operation and a recording of the image on the film 35 are completed based on a proper measuring of a distance and a proper measuring of light amount.

Figure 3A:
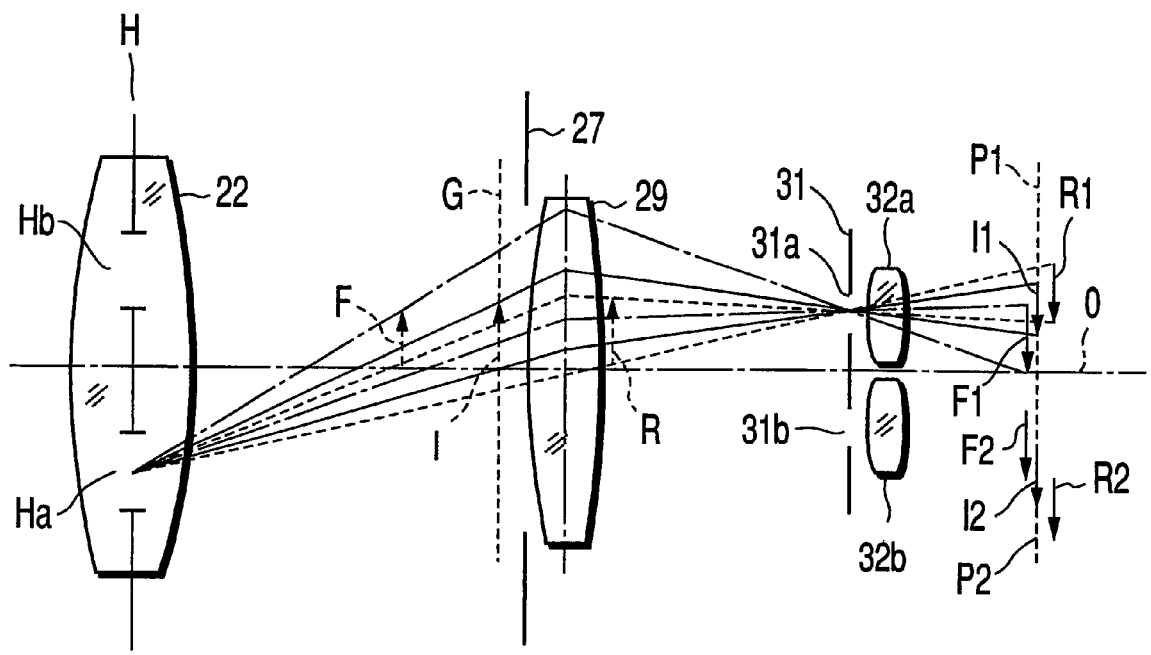
FIGS. 3A and 3B schematically illustrate a camera optical system including an AF (automatic focus) optical system.
Figure 3B:
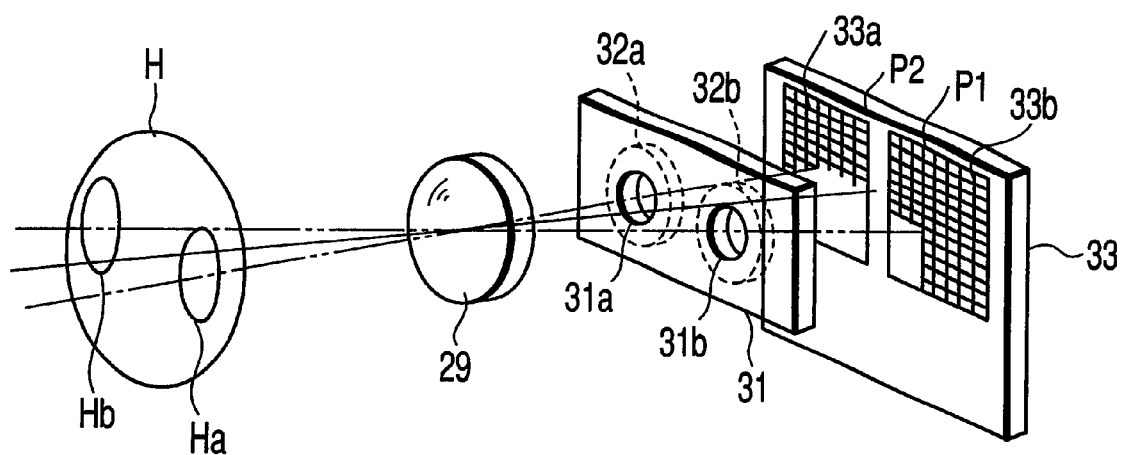

FIGS. 3A and 3B schematically show a camera optical system including an AF optical system.

FIG. 3A shows a structure of a focus detecting optical system (a phase difference detecting optical system) for guiding light beams from an image picked-up subject onto first and second groups of photoelectric conversions elements P1 and P2 on the area sensor 33 within the focus detector 21 shown in FIG. 3B.

FIG. 3B also shows a perspective view of this structure.

As shown in FIG. 3A, in the optical path, there are provided the image pickup lens 22, the field-of-vision mask 27 for defining a field of vision, the condenser lens 29, and the pupil mask 31 having apertures 31a and 31b disposed in almost symmetrically with respect to the optical axis of the image pickup lens 22.

Further, at the backside of the apertures 31a and 31b, there are provided the image re-forming lenses 32a and 32b corresponding to these apertures.

The above-described total reflection mirror 30 is omitted from this FIG. 3A.

In this optical path, the incident light beams of the image picked-up subject passed through areas Ha and Hb of an ejection pupil H of the image pickup lens 22 sequentially pass through the field-of-vision mask 27, the condenser lens 29, the apertures 31a and 31b of the pupil mask 31, and the image re-forming lenses 32a and 32b respectively, so that images are re-formed on the first and second groups of photoelectric conversion elements P1 and P2 on two areas 33a and 33b in which a large number of photoelectric conversion elements are laid out respectively within the area sensor 33.

When the image pickup lens 22 is "in focus", that is, when an image I of the subject is formed on an image-forming surface G, for example, this image I of the subject is formed again on the first and second groups of photoelectric conversion elements P1 and P2 respectively on the area sensor 33 that is a secondary image-forming surface perpendicular to an optical axis O, by the condenser lens 29 and the image re-forming lenses 32a and 32b. As a result, a first image I1 and a second image I2 are formed as shown in FIG. 3A.

Further, when the image pickup lens 22 is "in front focus", that is, when an image F of the subject is formed in front of the image-forming surface G, this image F of the subject is formed again on a surface, before the area sensor 33, perpendicular to the optical axis O in a state that the re-formed images F are closer to the optical axis. As a result, a first image F1 and a second image F2 are formed as shown in FIG. 3A.

Further, when the image pickup lens 22 is "in rear focus", that is, when an image R of the subject is formed at the rear of the image-forming surface G, this image R of the subject is formed again on a surface, after the area sensor 33, perpendicular to the optical axis O in a state that the re-formed images R are away from the optical axis. As a result, a first image R1 and a second image R2 are formed as shown in FIG. 3A.

Accordingly, when a distance between the first image and the second image is detected and measured, it is possible to detect the in-focus state of the image pickup lens 22, including the in-front-focus state and the in-rear-focus state.

Specifically, the focus detecting optical system is so structured that it can measure a distance between the two images based on the light intensity distributions of the first image and the second image respectively obtained from an output of the image data of the subject corresponding to the two areas 33a and 33b of the area sensor 33.

Figure 4:
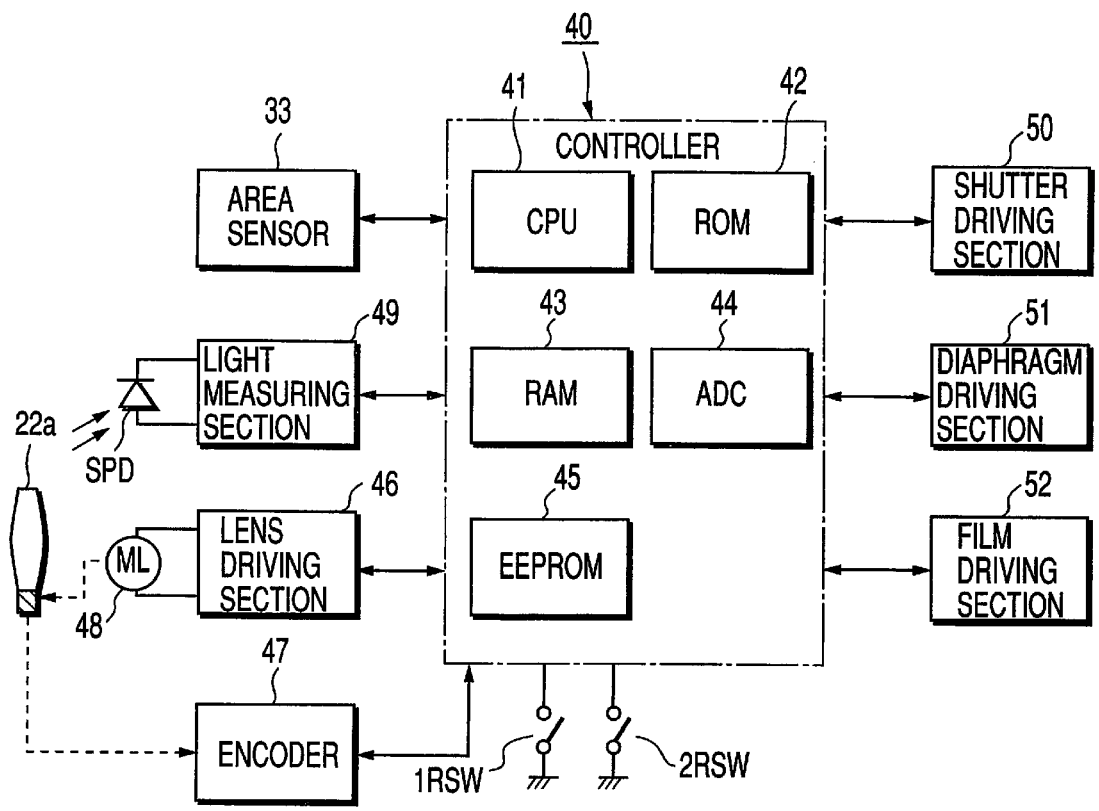
FIG. 4 is a block diagram for showing a structure of the single-lens reflex camera shown in FIG. 2 including an electric control system thereof.

FIG. 4 shows a functional block diagram including an electric control system of the single-lens reflex camera shown in FIG. 2.

A detailed structure and operation of each part will be explained below with reference to FIG. 4.

As shown in FIG. 4, a controller 40 functions as comprehensive control means for this camera. Inside the controller 40, there are provided, for example, a CPU (central processing unit) 41, a ROM 42, a RAM 43, an A/D converter (ADC) 44, and an EEPROM 45.

Then, the controller 40 controls a series of operations of the camera according to a camera sequence program (to be described in detail later) stored in the ROM 42 inside the controller 40.

The EEPRROM 45 can store and hold correction data relating to the AF control, light measurement, etc. as the information own to each camera body.

To the controller 40, there are externally connected an area sensor 33, a lens driving section 46, an encoder 47, a light measuring section 49, a shutter driving section 50, a diaphragm driving section 51, and a film driving section 52, so that each section can mutually communicate with the controller 40, as shown in FIG. 4.

Each of these externally connected elements is structured to operate as follows.

The lens driving section 46 is also connected to a motor ML 48 to drive the focusing lens 22a of the image pickup lens 22 through this motor ML 48 based on a control of the controller 40.

A pulse according to a move amount of the focusing lens 22a is generated in the encoder 47. The controller 40 reads this pulse to suitably control the lens driving based on this pulse.

The light measuring section 49 has an SPD (silicon photo diode) corresponding to an image pickup area to generate an output according to the luminance of the image picked-up subject.

The controller 40 A/D-converts the output from the light measuring section 49 by the A/D converter ADC 44, and stores this A/D-converted output as a light measured value in the RAM 43.

The shutter driving section 50 and the diaphragm driving section 51 operate respectively based on a predetermined control signal from the controller 40, and drive respectively a shutter mechanism and a diaphragm mechanism not shown, to expose beams onto the film surface 35 shown in FIG. 2.

The film driving section 52 carries out an automatic loading, an automatic winding and an automatic rewinding of the film 35 based on a predetermined control signal from the controller 40.

A first release switch (hereinafter to be referred to as 1RSW) and a second release switch (hereinafter to be referred to as 2RSW) are switches connected to the release button. When the release button is depressed at a first stage, the 1RSW is turned ON first. Then, when the release button is depressed again at a second stage, the 2RSW is turned ON.

The controller 40 suitably controls each section so that a light measuring processing and an AF (automatic focus adjusting) processing are carried out when the 1RWS has been turned ON, and an exposure operation and a film winding operation are carried out when the 2RWS has been turned ON.

Figure 5:
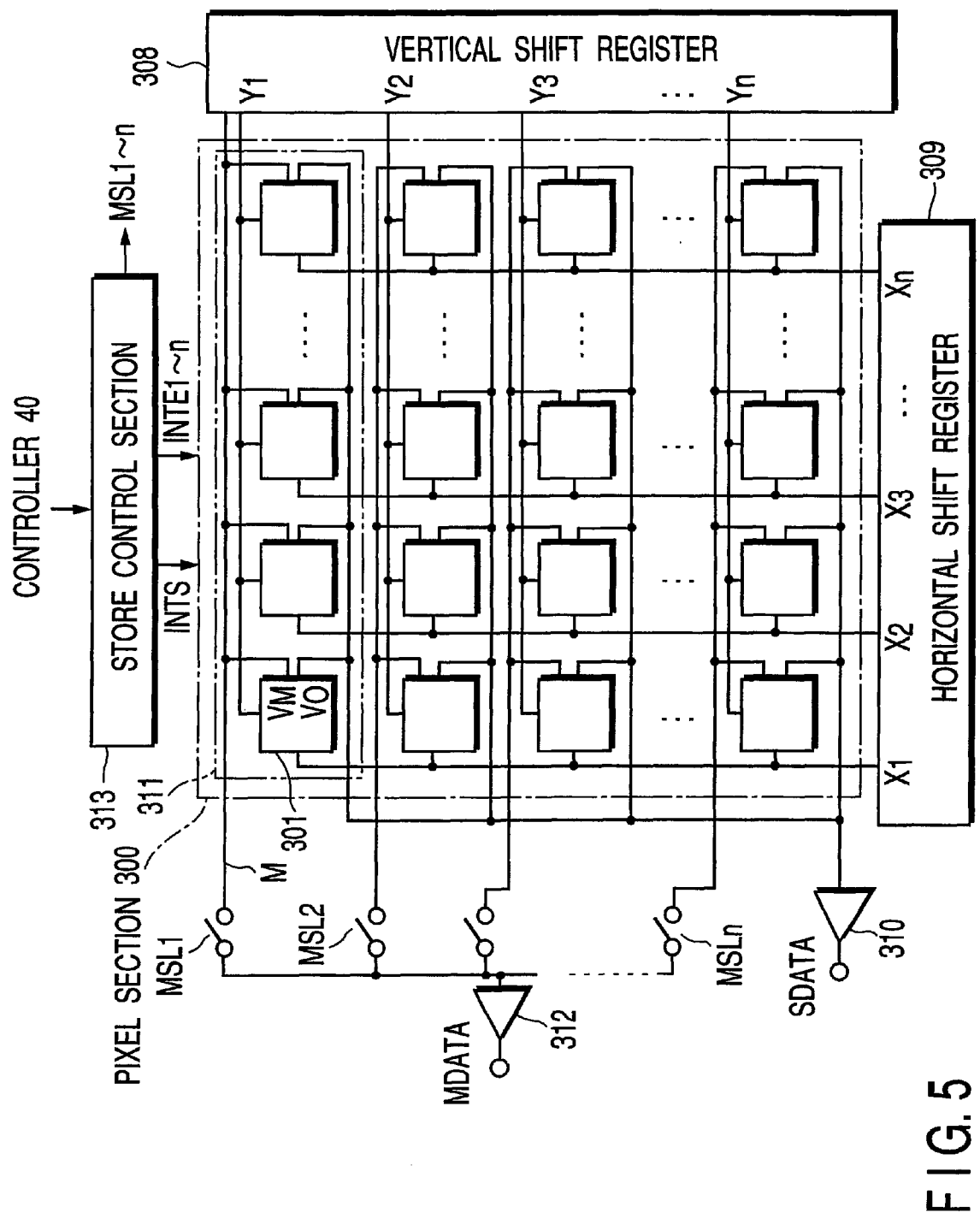
FIG. 5 is a circuit diagram for showing an internal structure of the area sensor shown in FIG. 4.

FIG. 5 is a circuit diagram for showing in detail the circuit structure of the above-described area sensor 33.

A pixel portion 300 (that is, the first and second groups of photoelectric conversion elements P1 and P2) of the area sensor 33 is structured by a large number of pixel units 301 arrayed in order in two dimensions.

Each section of the area sensor 33 operates as follows.

A storage control section 313 controls a storing operation of the pixel portion 300 according to a control signal from the controller 40.

An output (VO) of each pixel unit 301 is selected by a vertical shift register 308 and a horizontal shift register 309, and is input to a buffer 310.

Then, an output SDATA from this buffer 310 is input to the A/D converter ADC 44 within the controller 40 shown in FIG. 4, and is A/D-converted.

An output (VM) of each pixel unit 301 is input to a buffer area 312 through a corresponding one of switches MSL1 to MSLn connected to each output terminal VM of the plurality of pixel units 301.

Within an area 311, there is generated a potential corresponding to a peak value out of values of the output terminals VMs within the plurality of pixel units 301, at a point M at which the output terminals VMs of the plurality of pixel units 301 are connected.

In other words, the pixel units 301 structure a peak detecting circuit for outputting a potential corresponding to the peak values.

Accordingly, when the switches MSL1 to MSLn are turned ON sequentially, it is possible to monitor through the buffer 312 a potential corresponding to a peak value within each area 311.

Then, an output VP of the buffer 312 is input to the A/D converter ADC 44 within the controller 40, from a terminal MDATA, and is A/D-converted.

Figure 6:
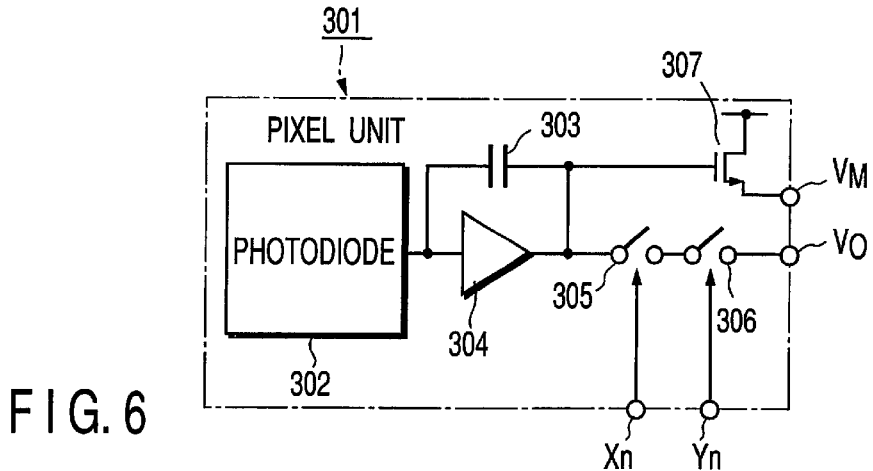
FIG. 6 is a circuit diagram for showing a structure of a pixel unit shown in FIG. 5.

Next, a unit circuit structure of the above-described pixel unit 301 will be explained based on FIG. 6.

Each pixel unit 301 is structured by a photodiode 302, a capacitor 303, an amplifier 304, switches 305 and 306, and an NMOS transistor 307.

The photodiode 302 as a photoelectric conversion element, is connected to the capacitor 303 for storing a charge generated inside the photodiode, and the amplifier 304 respectively.

An output terminal of the amplifier 304 is connected to an output terminal VO through the switch 305 and the switch 306 that are selectively turned ON based on signals Xn and Yn from the vertical shift register 308 and the horizontal shift register 309 shown in FIG. 5, respectively.

Further, the output terminal of the amplifier 304 is also connected to a gate of the NMOS transistor 307 having its drain connected to a fixed voltage.

A source of the NMOS transistor 307 is connected to the monitor output terminal VM.

In this case, the potential of the output terminal of the amplifier 304 changes in an increasing trend, when a charge from the photodiode 302 is stored increasingly.

Then, as described above, a potential that shows a peak value of the stored charge amount is generated at the point M where the monitor output terminals VMs of the plurality of pixel units 301 are mutually connected.

In the manner as described above, each pixel unit 301 supplies an output of the photoelectric conversion element corresponding to this area, to the image move-amount detecting section 3.

Figure 7:
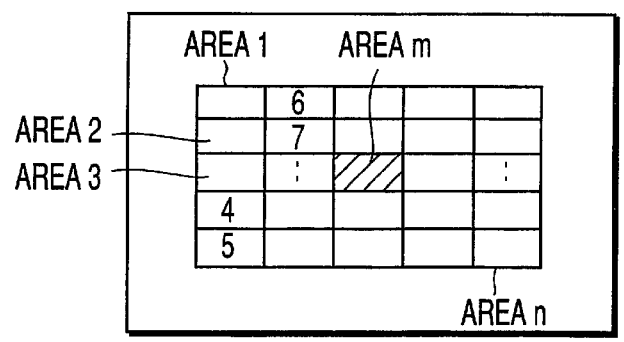
FIG. 7 is a schematic view for showing a layout of 1 to n that are detection areas within a photographed screen.

FIG. 7 shows a disposition of areas 1 to n for structuring a detection area within the image pickup screen.

The above-described switches MSL1 to MSLn are connected to the areas 1 to n shown in FIG. 7, respectively.

Accordingly, when one switch MSLm out of the switches MSL1 to MSLn has been depressed, for example, a peak output VM within the area m corresponding to this switch is selected, and this peak output can be output to the monitor terminal MDATA.

Also, when a plurality of switches have been depressed, it is possible to monitor peak values within the corresponding plurality of areas.

For example, when all the switches MSL1 to MSLn have been depressed, it is possible to monitor all peak values within all the areas of the area sensor 33, by making an output of these peak values from the MDATA terminal.

Figure 8:
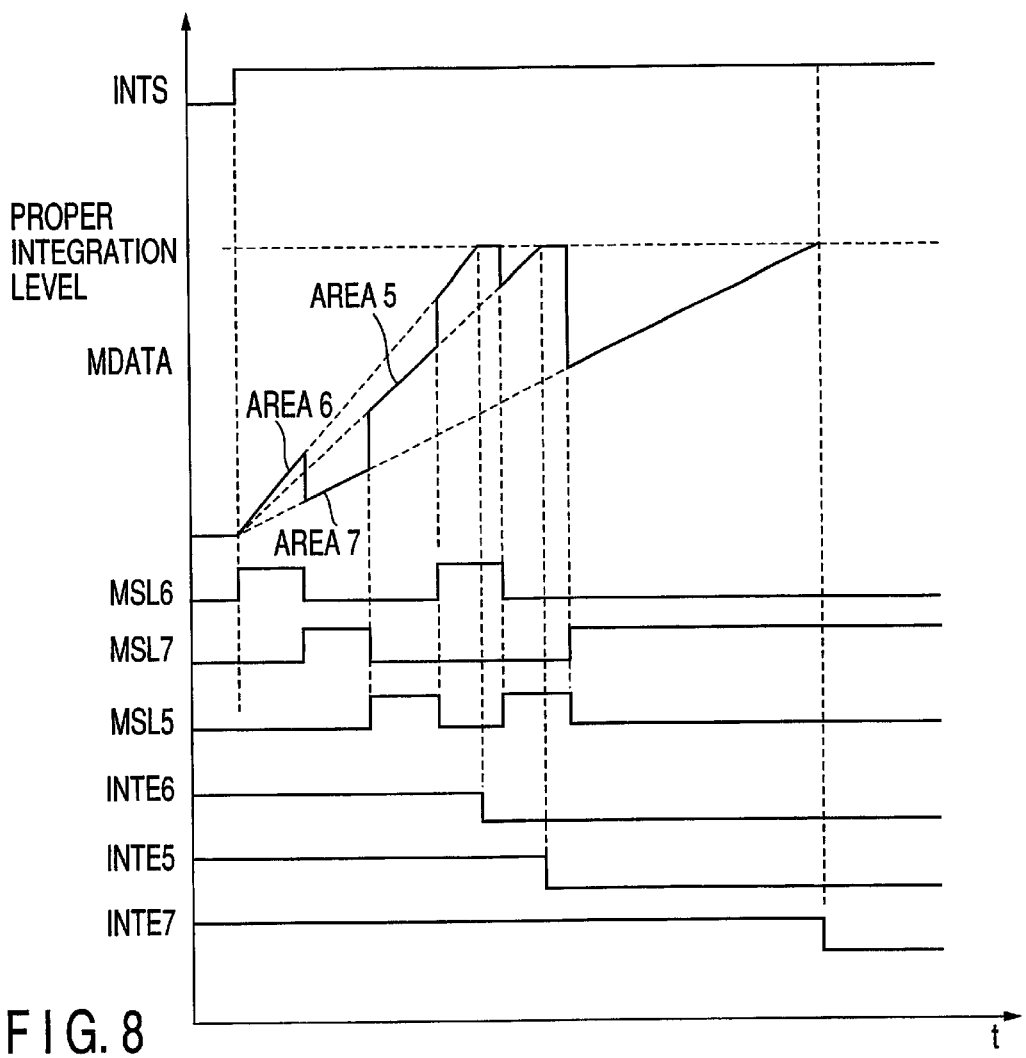
FIG. 8 is a time chart for showing a storing operation of the area sensor.

Next, the storing operation of the area sensor 33 will be explained based on a time chart shown in FIG. 8.

It is assumed here that areas 5, 6 and 7 within the image pickup screen are detected. The controller 40 controls the storing operation of the area sensor 33 to be started based on a store starting signal (INTS), and then sequentially refers to a peak value in each area.

In this case, an area in which a proper store level reaches at the earliest timing is referred to with priority. When a peak value in the area concerned has reached a proper store level, the storing operation is finished in each area based on a store-finishing signal (INTE).

Figure 9A:
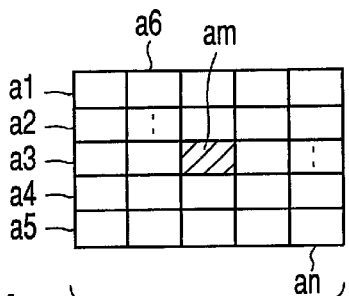
FIGS. 9A and 9B are schematic views for showing positions of two areas in the area sensor.
Figure 9B:
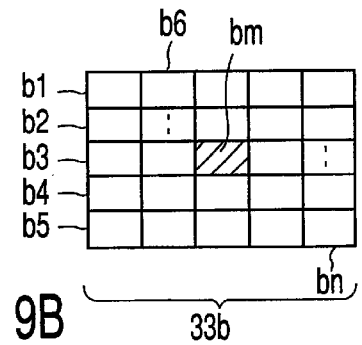

In other words, as shown in FIGS. 9A and 9B, the storing operation is finished simultaneously in small areas to which the two areas 33a and 33b structuring the area sensor 33 correspond. For example, the storing operation is finished simultaneously in areas a5 and b5 corresponding to the area 5.

In other words, the storing operation is carried out sequentially in areas am and bm (1<m<n) corresponding to a certain area.

The storing operation is finished in all areas by sequentially conducting a similar operation.

Figure 10A:
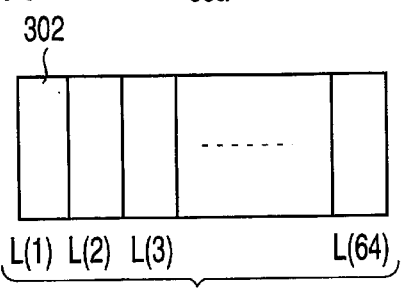
FIGS. 10A and 10B are explanatory views for showing arrays of photodiodes corresponding to one area m.
Figure 10B:
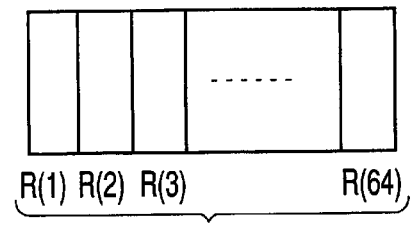

FIGS. 10A and 10B show a one-dimensional layout of a photodiode corresponding to one area m of the am and bm respectively.

Photodiode rows am for structuring the area 33a on the left side of the drawing can be expressed as L(1), L(2), L(3), . . . , L(64), and image signals of the image picked-up subject are processed in one dimension.

Similarly, photodiode rows bm for structuring the area 33b on the right side of the drawing are expressed as R(1), R(2), R(3), . . . , R(64), and image signals of the image picked-up subject are processed in one dimension.

Then, the controller 40 controls each section as follows to detect the images of the subject as data.

In other words, when the controller 40 controls a read clock signal CLK to be input to the area sensor 33, sensor data that are the image signals of the subject are output sequentially from the terminal SDATA of the area sensor 33.

Then, the A/D converter ADC 44 within the controller 40 A/D-converts the corresponding sensor data, and stores sequentially the A/D-converted data in the RAM 42.

In this manner, the controller 40 can, for example, read out only the sensor data corresponding to an area that has been assigned by the controller 40.

There will be explained next the AF detecting operation based on the image picked-up data obtained as described above.

In the present embodiment, two methods of conducting correlation calculations are available, for example.

One method is a one for obtaining a deviation amount between two images (hereinafter to be referred to as an "image deviation amount") by conducting a correlation calculation between a first image and a second image of the subject divided by the focus detecting optical system.

The other method is a one for obtaining a move amount of an image picked-up subject by conducting a correlation calculation between an image of the subject at a time t0 and an image of the subject at a time t1.

(1) Correlation calculation for obtaining an image deviation amount

At first, there will be explained a correlation calculation for obtaining an image deviation amount between the first image and the second image of the subject.

In general, image data can be expressed by L (i, j) and R (i, j) respectively for the pair of areas 33a and 33b within the area sensor 33.

To facilitate the explanation, a pair of small areas corresponding to the areas 33a and 33b, that is, one-dimensional image data, will be expressed as L(I) and R(I) (I=1 to k) (see FIGS. 10A and 10B).

In the present embodiment, this calculation method will be explained based on a processing procedure relating to an "image deviation amount detecting" routine as shown in a flowchart in FIG. 11, by assuming that k=64.

At first, at step S100, initial values of variables SL, SR and FMIN are set.

At step S101, 8 is input as an initial value of a loop variable J.

At step S102, a correlation calculation of the following Expression (1) is carried out, for obtaining a correlation value F(s).

$$F(s)=\Sigma|L(SL+I)-R(SR+I)| \quad (1)$$

(s=SL−SR, I=0 to 26)
where SL and SR represent variables for showing header positions of blocks for conducting a correlation calculation of the image data L(I) and R(I) respectively.

J represents a variable for storing a number of shifts of blocks on the image data R(I).

It is assumed that the number of image data of the blocks is 27.

At step S103, the correlation value F(s) and FMIN are compared with each other, where FMIN is an initial value=0 at the beginning. Thereafter, FMIN is the initial value or an updated value.

When the correlation value F(s) is smaller than FMIN, FMIN is updated to F(s). Then, SLM and SRM are updated to SL and SR respectively at step S104.

On the other hand, when FMIN is smaller than the correlation value F(s), the process proceeds to step S105 without updating FMIN.

At step S105, 1 is subtracted from SR and J respectively, and the next block is set.

At step S106, it is judged whether J=0 or not. When J is not equal to 0 yet, the process goes back to the step S102, and a similar correlation calculation is repeated.

In this way, the block in the image data L(I) is fixed, and the block in the image data R(I) is shifted by each one pixel, thereby conducting a correlation calculation.

On the other hand, when J has become equal to 0, the process proceeds to the next step S107, where 4 and 3 are added respectively to the variable SL and SR, and the next block is set.

At step S108, it is judged whether SL=29 or not. When SL is not equal to 29, the process goes back to the step S101, and the correlation calculation is continued.

On the other hand, when SL=29, this correlation calculation is finished.

As described above, blocks for carrying out a correlation calculation are set on the image data L(I) and R(I), and the correlation calculation is repeated.

As a result of the correlation calculation of blocks obtained, the correlation value F(s) becomes a minimum when the shift amount s=x, based on which there is a highest correlation between the image data.

In this case, SL and SR are stored in SLM and SRM when the minimum correlation value is F(s).

Next, at step S109, based on the following Expression (2) and Expression (3), there are obtained correlation values FM and FP at shift positions before and after the minimum correlation value F (x) that are used for calculating a reliability index that will be explained later.

$$FM=\Sigma|L(SLM+I)-R(SRM+I-1)| \quad (2)$$

(I=0 to 26)

$$FP=\Sigma|L(SLM+I)-R(SRM+I-1)| \quad (3)$$

(I=0 to 26)

At step S110, there is calculated a reliability index SK for judging the reliability of a correlation calculation.

This reliability index SK is a numerical value obtained by standardizing a sum of the minimum correlation value F (x) and a second smallest correlation value FP (or FM), based on a value corresponding to a contrast of the image data (FM−F (x) or FP−F (x)). This reliability index is obtained from the following Expression (4) or Expression (5).

$$SK=(F(x)+FP)/(FM-F(x)) \quad (4)$$

(FP<FM)

$$SK=(F(x)+FM)/(FP-F(x)) \quad (5)$$

(FP≧FM)

At step S111, when the reliability index SK is equal to or above a predetermined value α, it is judged that there is a low reliability. When the reliability is low like this, an image-undetectable flag is set at step S113.

On the other hand, when it is judged that there is a high reliability, the process proceeds to a step S112, and an image deviation amount ΔZ is calculated.

For example, a shift amount x0 for giving a minimum value FMIN=F (x0) to a continuous correlation amount is obtained from the following expressions based on a three-point interpolation method.

$$x0=SRM-SLM+(FM-FP)/\{2\cdot(FM+F(x))\} \quad (6)$$

(FM≧FP)

$$x0=SRM-SLM+(FP-FP)/\{2\cdot(FP+F(x))\} \quad (7)$$

(FM<FP)

The image deviation amount Δz can be obtained from the following Expression (8) by using the above x0.

$$\Delta Z=x0-\Delta Z0 \quad (8)$$

(ΔZ0 is an image deviation amount when the image is in focus.)

Based on the image deviation amount ΔZ obtained from the above expression, it is possible to obtain a defocus amount ΔD of an image screen with respect to a scheduled focusing surface, from the following Expression (9).

$$\Delta D=B/(A-\Delta Z)+C \quad (9)$$

(A, B and C are constants determined by the focus detecting optical system.)

A defocus amount is calculated for each of the plurality of selected areas.

Then, from the plurality of areas, a defocus amount that shows a closest distance, for example, can be selected.

Further, from the above-selected defocus amount ΔD, a lens driving amount ΔL is obtained from the following Expression (10).

$$\Delta L=b-a\cdot b/(a\cdot\Delta D)+c\cdot\Delta D \quad (10)$$

(a, b and c are constants determined by the photographing optical system.)

Then, it is possible to obtain an in-focus state by driving the focus lens based on the lens driving amount ΔL.

(2) Principles of predicting an image position of an image picked-up subject

The principles of detecting a focus of a moving subject will be explained below with reference to FIGS. 12A, 12B, 12C and 12D.

A relationship between an image picked-up subject 100, a camera 20 and an area sensor 33 will be observed. For example, when the subject 100 is approaching straight toward the camera 20 (in a direction of an arrow G3) as shown in FIG. 12A, the first image and the second image of the subject on the first sensor (L) and the second sensor (R) respectively move toward the outside between the time t0 and the time t1, based on the principle of focus detection as described previously.

In this case, the move amounts ΔXL and ΔZXR of the images of the subject are equal to each other.

When the subject 100 makes a parallel move in a lateral direction (in a direction of an arrow G1) with respect to the camera 20, that is in a direction orthogonal with the optical axis, as shown in FIG. 12B, the two images of the subject move in the same direction In this case, the move amounts ΔXL and ΔZXR of the images of the subject are equal to each other.

Further, when the subject 100 approaches toward the left front of the camera 20 (moves in a direction of an arrow G4) as shown in FIG. 12C, the move amount of the first image (L) becomes small, as the move amount of the image toward the outside based on the approaching of the subject and the move amount of the image to the left side based on the parallel move of the subject toward the left are mutually cancelled.

Similarly, when the subject 100 moves away from the camera 20 in a left back direction (in a direction of an arrow G3) as shown in FIG. 12D, the move amount of the first image (L) becomes smaller, as the move amount of the image toward the inside based on the moving-away of the subject and the move amount of the image to the left side based on the parallel move of the subject toward the left are mutually cancelled.

On the other hand, the move amount of the second image (R) becomes larger, as the move amount of the image to the inside based on the moving-away of the subject and the move amount of the image to the left side based on the parallel move of the subject toward the left are added together.

In this case, when the means for carrying out a correlation calculation to be described later detects the move amounts ΔXL and ΔXR of the first and second images of the subject respectively based on the images at the time t0 and the time t1, it is possible to obtain the move amounts of the images in an optical axial direction as ΔXR−ΔXL, and to obtain the moves of the images in a lateral direction as ΔXR+ΔXL, when the move in a right direction is expressed by a+mark.

Accordingly, when the move amounts ΔXR and ΔXL of the images between the time t0 and the time t1 are obtained, it is possible to predict positions of the images at a time t2.

When the image picked-up subject is moving at a constant speed, move speed of the images in a lateral direction becomes constant.

The moves of the images in an optical axial direction do not exactly become a constant speed, but this speed can be regarded as a constant speed when the moves are in a very short period of time.

Accordingly, the predicted position of the first image at the time t2 has moved from the image position at the time t1 by ΔXL' as shown in the following Expression (11).

$$\Delta XL'=(t2-t1)/(t1-t0)\cdot\Delta XL \quad (11)$$

Similarly, a predicted position of the second image has moved by ΔXR' as shown in the following Expression (12).

$$\Delta XR'=(t2-t1)/(t1-t0)\cdot\Delta XR \quad (12)$$

Further, when the image deviation amount of the first image and the second image at the time t1 is ΔZ, a predicted image deviation amount ΔZ' at the time t2 is obtained from the following Expression (13).

$$\Delta Z'=\Delta Z+(\Delta XR'-\Delta XL')=\Delta Z+(t2-t1)/(t1-t0)\cdot\Delta XR-\Delta XL) \quad (13)$$

Then, based on this predicted image deviation amount ΔZ', a lens driving amount is obtained.

When the time t2 is set as the time before starting the exposure, it is possible take a picture based on a focused image of the moving subject.

A correlation calculation for obtaining move amounts of the images and a judgment for judging the reliability of the correlation calculation will be explained next.

Images of the object L' (I) and R' (I) at the time t0, correlation blocks SLM' and SRM' obtained from the correlation calculation between the two images, a correlation coefficient SK', and an image deviation amount ΔZ' are stored respectively in the RAM 42 within the controller 40.

Thus, the image signals L(I) and R(I) at the time t1 are detected.

The correlation calculation method will be explained below with reference to flowcharts of FIGS. 13 and 14 that show moves of the images.

At first, for the first image signal, a correlation calculation is carried out based on the image signal L'(I) at the time t0 and the image signal L(I) at the time t1.

In a "move amount detecting" routine for detecting moves of the images, at first, the variable SL is substituted by SLM'−10 (step S200).

The variable J for counting a correlation range is substituted by 20 as an initial value (step S201).

At step S202, to obtain an output F(s), a correlation is carried out based on a correlation equation as shown in the following Expression (14).

$$F(s)=\Sigma|L'(SLM+I)-L(SL+J-1)| \quad (14)$$

(I=0 to 26)

Then, F(s) and FMIN are compared with each other in a similar manner to that as described above (step S 203). When F(s) is smaller than FMIN, FMIN is substituted by F(s), and SL at this time is stored in SLM (step S204).

In this case, the number of block elements for carrying out the correlation is 27 which is the same as the number of block elements for obtaining the above-described image deviation amount.

Next, 1 is added to SL, and 1 is subtracted from J (step S205).

The calculation based on the correlation equation F(s) is repeated until J becomes equal to 0 (step S206).

The correlation calculation is repeated by changing the correlation range to ±10 elements. This correlation range is determined based on a move amount detecting range.

At the next step S207, the reliability is judged.

In other words, correlation values FM and FP in the shift amount around a minimum correlation value F (x) are obtained from the following Expressions (15) and (16), in a similar manner to that for obtaining the image deviation amount of the first and second images (step S207).

$$FM=\Sigma|L'(SLM'+I)-L(SLM+I-1)| \quad (15)$$

(I=0 to 26)

$$FP=\Sigma|L'(SLM'+I)-L(SLM+I-1)| \quad (16)$$

(I=0 to 26)

The reliability index SK can be obtained from the above-described Expressions (4) and (5), and therefore, their explanation will be omitted (step S208).

At step S209, when SK≦β, it is judged that there is a reliability in the correlation calculation, and then a move amount is obtained.

However, a judgment value β becomes larger than a judgment value α for obtaining image deviation amounts of the first and second images.

This is because there is a high potentiality that there exists a low correlation between two images, as waveforms change in many cases when the subject is moving.

Next, at step S210, the move amount ΔXL between the images L(I) and L'(I) is obtained from the following Expressions (17) and (18) based on the three-point interpolation method, in a similar manner to that used for calculating the image deviation amounts of the first and second images.

$$\Delta XL = SLM - SLM' + 1/2 \cdot \{(FM - FP)/(FM - F(x))\} \quad (17)$$

(when FM ≧ FP)

$$\Delta XL = SLM - SLM' + 1/2 \cdot \{(FM - FP)/(FP - F(x))\} \quad (18)$$

(when FM < FP)

On the other hand, when the relationship of SK≦β does not exist at the step S209, the process proceeds to a step S211, and an image-undetectable flag is set.

A similar move amount detecting routine is executed for the second images R(I) and R'(I), of which details are omitted. Then, a block position SRM having a highest correlation and the move amount ΔXR are obtained.

After the move amounts ΔXL and ΔXR of the first and second images have been obtained respectively, the image deviation amount ΔZ' at the time t1 is obtained from the following Expression (19) based on the image deviation amount ΔZ at the time t0.

$$\Delta Z' = \Delta Z + \Delta XR - \Delta XL \quad (19)$$

An estimation equation for predicting an image deviation amount ΔZ" at the time t2 based on the image deviation amount ΔZ at the time t0 is given by the following Expression (20).

$$\Delta Z''=\Delta Z'+(t2-t1)\cdot(\Delta XR-\Delta XL)/(t1-t0)=\Delta Z+(t2-t0)\cdot(\Delta XR-\Delta XL)/(t1-t0) \quad (20)$$

After the above image deviation amount at the time t2 has been obtained, the lens is driven by the amount based on the above ΔZ", so that it is possible to focus the moving subject at the time t2.

When the move speed v=(ΔXR−ΔXL)/(t1−t0) of the picked-up image is too large, it is judged that there is no reliability in the detected value, and thus, an image deviation amount is not predicted.

Further, when the move speed of the subject is small and is regarded as a detection error, the move speed is set to 0.

(3) Expression for predicting the image deviation amount predicting time t2

A method for predicting the time t2 based on a predicted image deviation amount will be explained next.

As described above, the image deviation amount ΔZ" at the time t2 can be obtained from the above Expression (20) based on the image deviation amount ΔZ at the time t1, and the image move amounts ΔXR and ΔXL of the images from the time t0 to t1 respectively.

The time t2 when the subject is in focus at the time of exposure is obtained from the following Expression (21).

$$t2=t1+td+ke\cdot\Delta Z''+te \quad (21)$$

In the above Expression (21), td represents a time taken from the time t1 until the lens is driven. This value includes the processing time within the camera such as the time required for the above-described correlation calculation.

ke represents a variable coefficient for obtaining a lens driving time proportional to the image deviation amount ΔZ".

The lens driving amount ΔL can be obtained from the above Expressions (9) and (10) based on the image deviation amount ΔZ". In an area where the image deviation amount ΔZ" is sufficiently small, the default focus amount ΔD and the lens driving amount ΔL can be approximated in proportion to the image deviation amount $\Delta Z''$. This has no problem of precision.

te represents a time taken from when the lens has been driven until when the shutter film has been opened and an exposure has started. This time includes the time required for calculating a camera exposure, a diaphragm control and a mirror up operation, etc.

The solving of the above-described Expressions (20) and (21) leads to the following Expression (22) for obtaining a prediction image deviation amount.

$$\Delta Z'' = \{\Delta Z + (t1 - t0 + td + te) \cdot (\Delta XR - \Delta XL)/(t1\ t0)\}/ \quad (22)$$
$$\{1 - ke \cdot (\Delta XR - \Delta XL)/(t1 - t0)\}$$

The lens is driven based on the lens driving amount $\Delta L$ obtained from the above Expressions (9) and (10) by using the above predict image deviation amount $\Delta Z''$. Thus, it is possible to focus the moving subject at the exposure time.

Next, the time t2 when the subject is in focus at the time of finishing the lens driving is obtained from the following Expression (23).

$$t2 = t1 + td + ke \cdot \Delta Z'' \quad (23)$$

Similarly, the following Expression (24) can be guided by solving the Expressions (20) and (23).

$$\Delta Z'' = \{\Delta Z + (t1 - t0 + td) \cdot (\Delta XR - \Delta XL)/(t1\ t0)\}/ \quad (24)$$
$$\{1 - ke \cdot (\Delta XR - \Delta XL)/(t1 - t0)\}$$

The lens is driven based on the lens driving amount $\Delta L$ obtained from the above Expressions (9) and (10) using the above predict image deviation amount $\Delta Z''$. Thus, it is possible to focus the moving subject at the time of finishing the lens driving.

Figure 15:
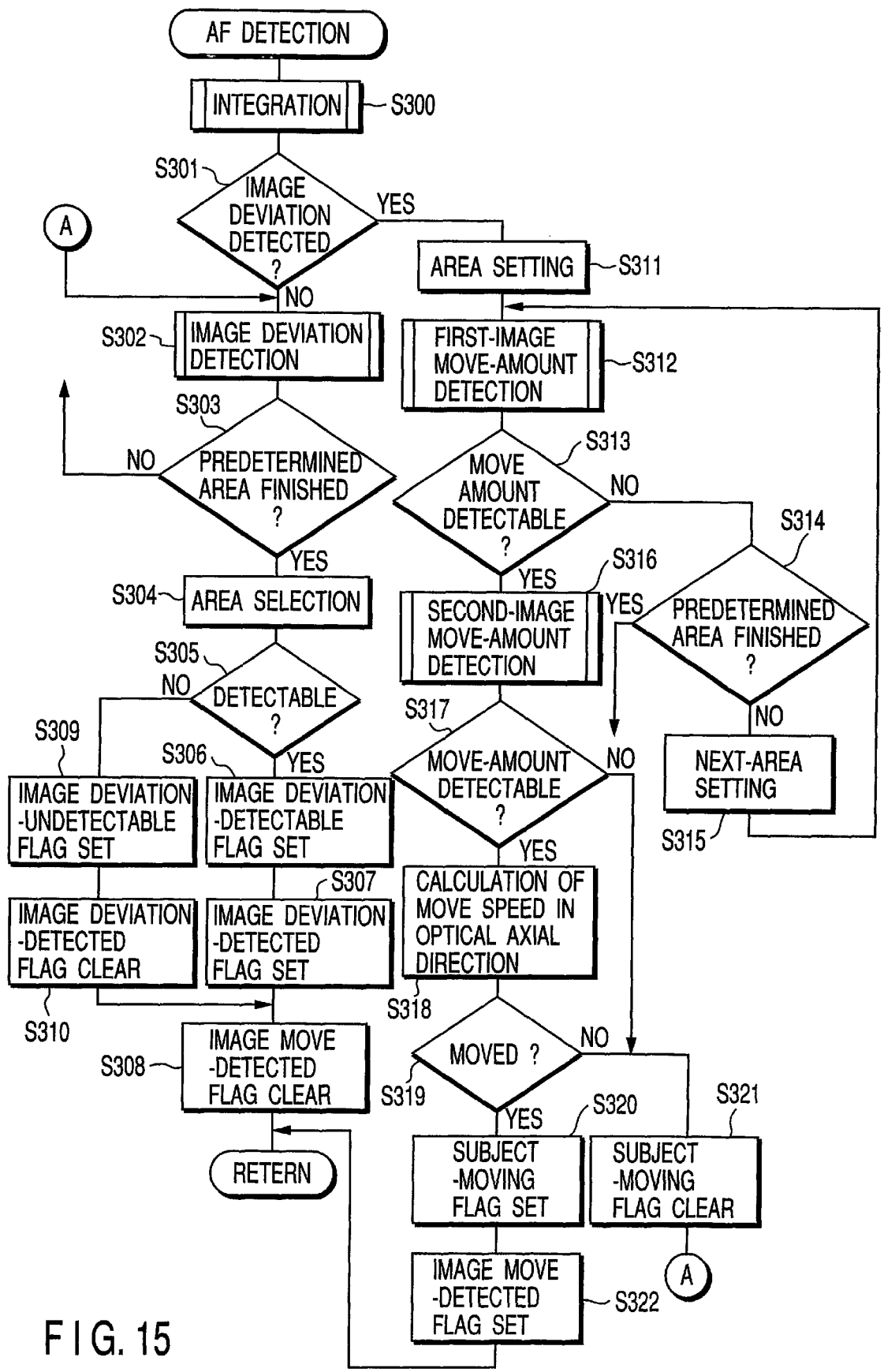
FIG. 15 is a flowchart for showing a process of an AF (automatic focus) detection.

Next, a detailed operation program in the present embodiment will be explained according to a flowchart shown in FIG. 15.

It is assumed that the "AF detection" routine shown in the drawing is executed repeatedly during a period while the camera power supply is in the ON status.

At step S300, the integration operation of the area sensor 33 is executed. When the integration has been finished, the image data of the area sensor (hereinafter to be referred to as sensor data) is read out from the area sensor 33.

At step S301, it is judged whether image deviation amounts of the images of the image picked-up subject (hereinafter to be referred to as the image deviation amounts) have been detected or not.

Figure 11:
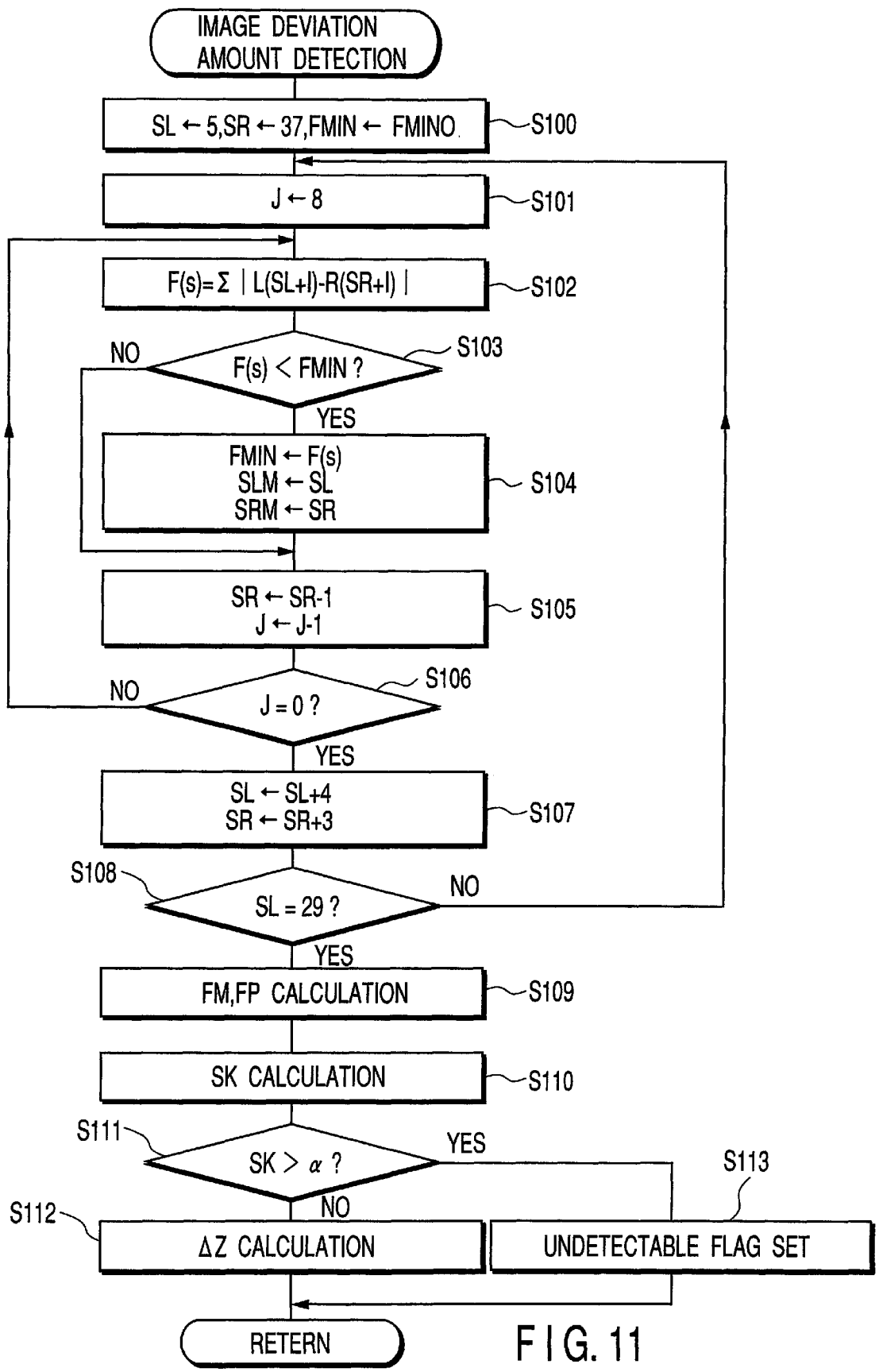
FIG. 11 is a flowchart for showing a processing procedure relating to a detection of an image deviation amount.

When the image deviation amounts have not yet been detected, the process proceeds to the next step S302, and the image deviation amounts are obtained from the above-described "image deviation amount detecting" routine (see FIG. 11).

In this case, the image deviation amounts are detected in predetermined small areas set in advance on the areas 33a and 33b.

The small area(s) set in advance may be one area selected by the photographer or the whole areas.

At step S303, it is judged whether the detection of image deviation amounts in the predetermined areas has been finished or not. When the detection has not been finished yet, the next small areas are set, and the process returns to the step S302, where the detection of the image deviation amounts in the above next small areas is carried out.

On the other hand, when the detection of image deviation amounts in all the predetermined small areas has been finished, area are selected based on a predetermined algorithm, for example, a selection of areas at a nearest position, at step S304.

Next, an explanation will be made based on the assumption that the selected areas are am and bm.

At step S305, it is judged whether an image deviation amount cannot be detected, that is, whether it is possible to detect image deviation amounts in all the predetermined areas or not. When it is judged that it is possible to detect the image deviation amounts, an image-detectable flag is set. Further, at a step S307, an image deviation-detected flag is set.

On the other hand, when it is judged, at the step S305, that it is not possible to detect image deviation amounts, an image-undetectable flag is set at step S309, and an image move-detected flag is cleared at step S310.

Then, at step S308, the image move-detected flag is cleared, and the process returns to a main routine to be described later.

When the image deviation amounts have already been detected based on the judgment at the step S301, the image move amounts between different times of the images are detected for each of the first and second images, as follows.

At step S311, the area am selected at the step S304 is set as an initial area.

At step S312, for the first image in the area am, a correlation calculation is carried out between the sensor data stored based on the image deviation amount detected at the last time (time t0) and the sensor data of the image deviation amount detected this time (t1). Thus, a move amount is detected (based on the move amount detecting routine shown in FIG. 14).

Then, at step S313, it is judged whether it has been possible or not to detect the move amount of the first image. When the move amount has been detected, the process proceeds to a step S316.

On the other hand, when the move amount has not been detected, the process proceeds to a step S314, where it is judged whether it is possible or not to detect image move amounts in all the predetermined areas. When it is judged that it is not possible to detect an image move amount in any one of the predetermined areas, the process returns to the step S302.

In this case, an image deviation amount between the first and second images is calculated, and the detection of image move amounts is carried out again starting from the next AF detection.

On the other hand, when the detection of image move amounts in all the areas has been finished at the above-described step S314, the process proceeds to a step S315, where the area at this time (time t1) is shifted according to a predetermined sequence, thereby setting the next area.

The above-described shifting in the predetermined sequence refers to the shifting of the area around the initial area an on the area 33a, in a direction orthogonal with the image-divided direction, as shown in the sequence of arrows in FIGS. 16A, 16B, 16C, 16D and 16E respectively.

The images are processed in this sequence because the images on the area sensor 33 move in a direction orthogonal with the image-divided direction by the up- and down-moves of the subject and a camera move due to a touch on the camera by hand.

Next, the process returns to the step S312, and an image move amount of the first image in the new set area is detected.

A position of the first image is searched in the above-described manner.

When the position of the first image of the subject has been detected and further when the move amount of the image during the period from the time t0 to the time t1 has been detected, the process proceeds to the next step S316.

It is assumed that ak represents an area in which the move amount of the first image has been detected at the time t1.

Figure 14:
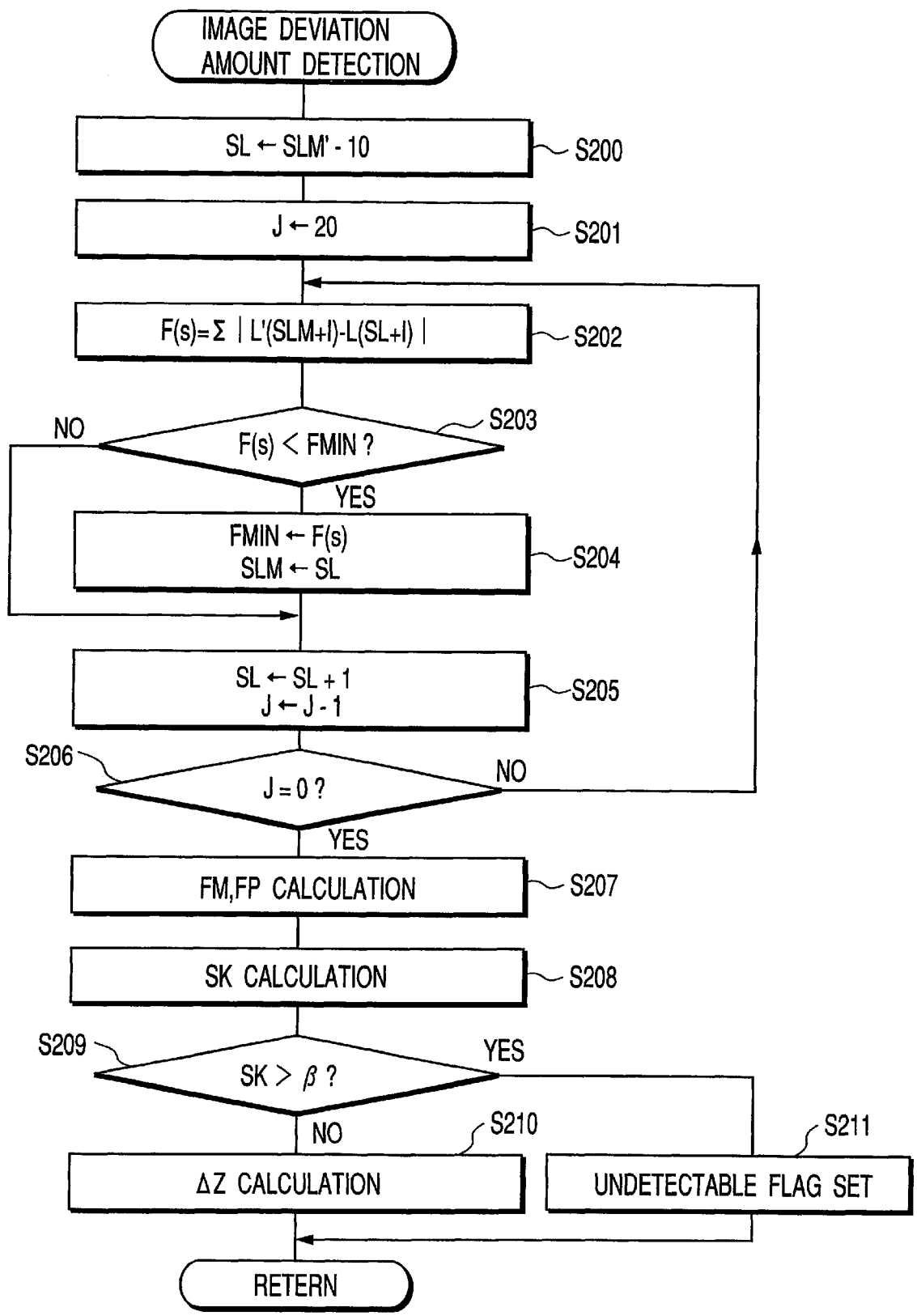
FIG. 14 is a flowchart for showing a process of detecting a move amount.

At the step S316, there is detected a move amount of the second image in the area bk on the area 33b that corresponds to the area ak in which the move amount of the first image has been detected (see the "moving amount detecting" routine shown in FIG. 14).

When a shift between areas has occurred in this case, the shift amount between the areas is added as the image move amount (for example, a distance from the center converted into a number of pixels), to ΔXL and ΔXR.

At step S317, it is judged whether an image move amount of the second image has been detected or not. When the image move amount has been detected, the process proceeds to step S318.

On the other hand, when the image move amount has not been detected, the process proceeds to step S321.

When both image move amounts of the first and second images have been detected, the move speed v of each image in an optical axial direction is calculated from the next Expression (25) at step S318.

$$v = (\Delta XR - \Delta XL)/(t1-t0) \tag{25}$$

Then, at step S319, the calculated move speed v is compared with a predetermined speed vth, and it is judged whether the subject has moved in an optical axial direction or not.

When it is judged that the subject has moved in an optical axial direction, the process proceeds to step S320, and a subject-moving flag is set.

Then, at step S322, an image move-detected flag is set, and the process returns to the main routine.

When it is judged, at the step S319, that the subject has not moved, the subject-moving flag is cleared at step S321, and the process returns to the step S302, where the detection process is carried out again starting from the detection of image deviation amounts.

Figure 17A:
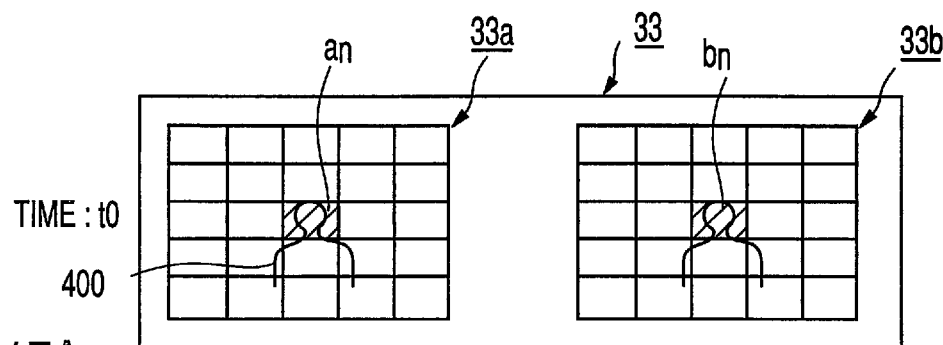
FIGS. 17A, 17B, 17C and 17D are explanatory views for showing a move of the camera and up- and down-moves of the subject, in an image of the subject on the area sensor respectively at different times.

FIG. 17A shows images of the subject which is moving in an optical axial direction of the camera and also moving in up and down directions. For example, the drawing shows images of a human body running toward the camera, on the areas 33a and 33b at the time t0 and t1 respectively.

It is not possible to detect a move amount of the image based on the sensor data (t0) in an area an of the area 33a at the time t0 and the sensor data (t1) in the area an of the area 33a at the time t1. This is because the image at the time t0 is an image of a human body 400 and the image at the time t1 is an image of the background. These data have no correlation.

For the same reason as described above, it is not possible to detect a move amount of the image based on the sensor data (t0) in an area bn of the area 33b at the time t0 and the sensor data (t1) in the area bn of the area 33b at the time t1.

Figure 17B:
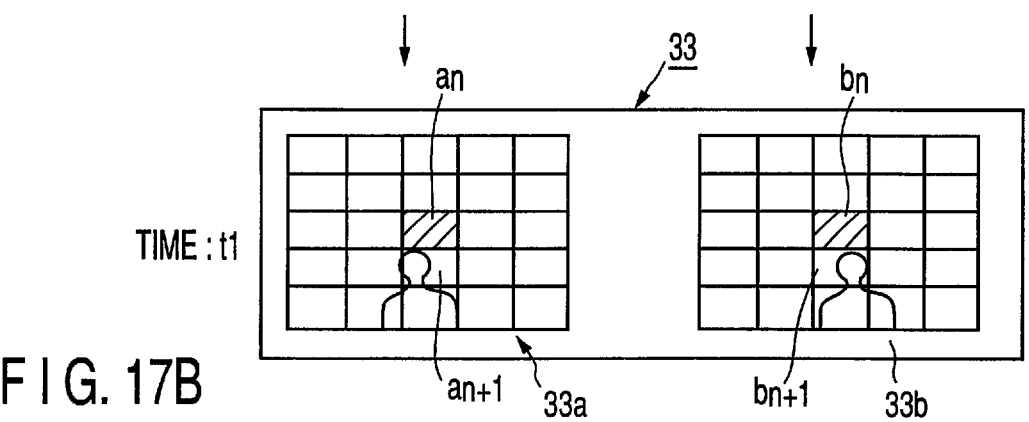
Figure 17C:
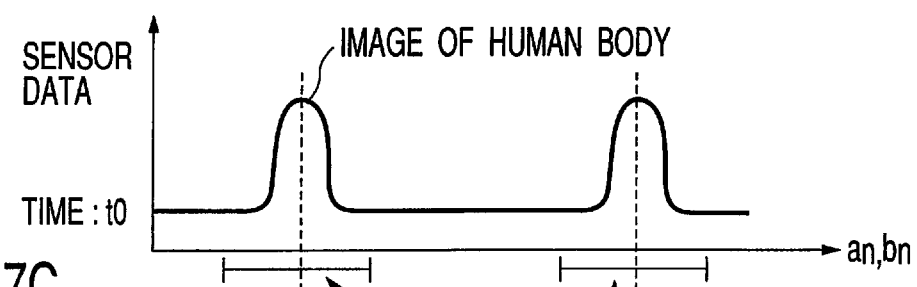
Figure 17D:
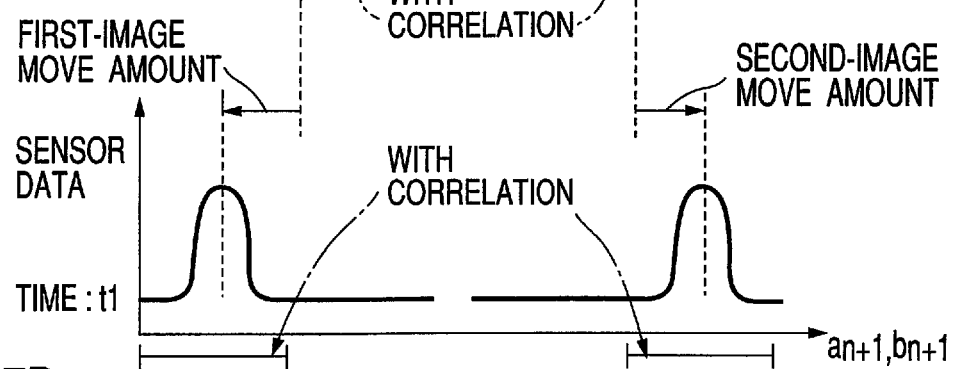

On the other hand, it is possible to detect a move amount of the image based on the sensor data (t0) in the area an at the time t0 and the sensor data (t1) in an area (an+1) at the time t1. This is because both images are the images of the same human body, which have a high correlation, as shown in FIG. 17B.

Further, for the same reason as described above, it is possible to detect a move amount of the image based on the sensor data (t0) in the area bn at the time t0 and the sensor data (t1) in an area (bn+1) at the time t1.

As explained above, even if it is not possible to detect an image move amount based on the sensor data of the same area, it is possible to detect a move amount of the image of the moving subject moving in up and down directions, by detecting a move amount from the data sensor of an area that has shifted in a direction approximately orthogonal with the image-divided direction.

Further, when a position of the image has changed due to a slight move of the camera due to a touch on the camera by hand, it is also possible to detect the image in a similar manner.

Figure 18:
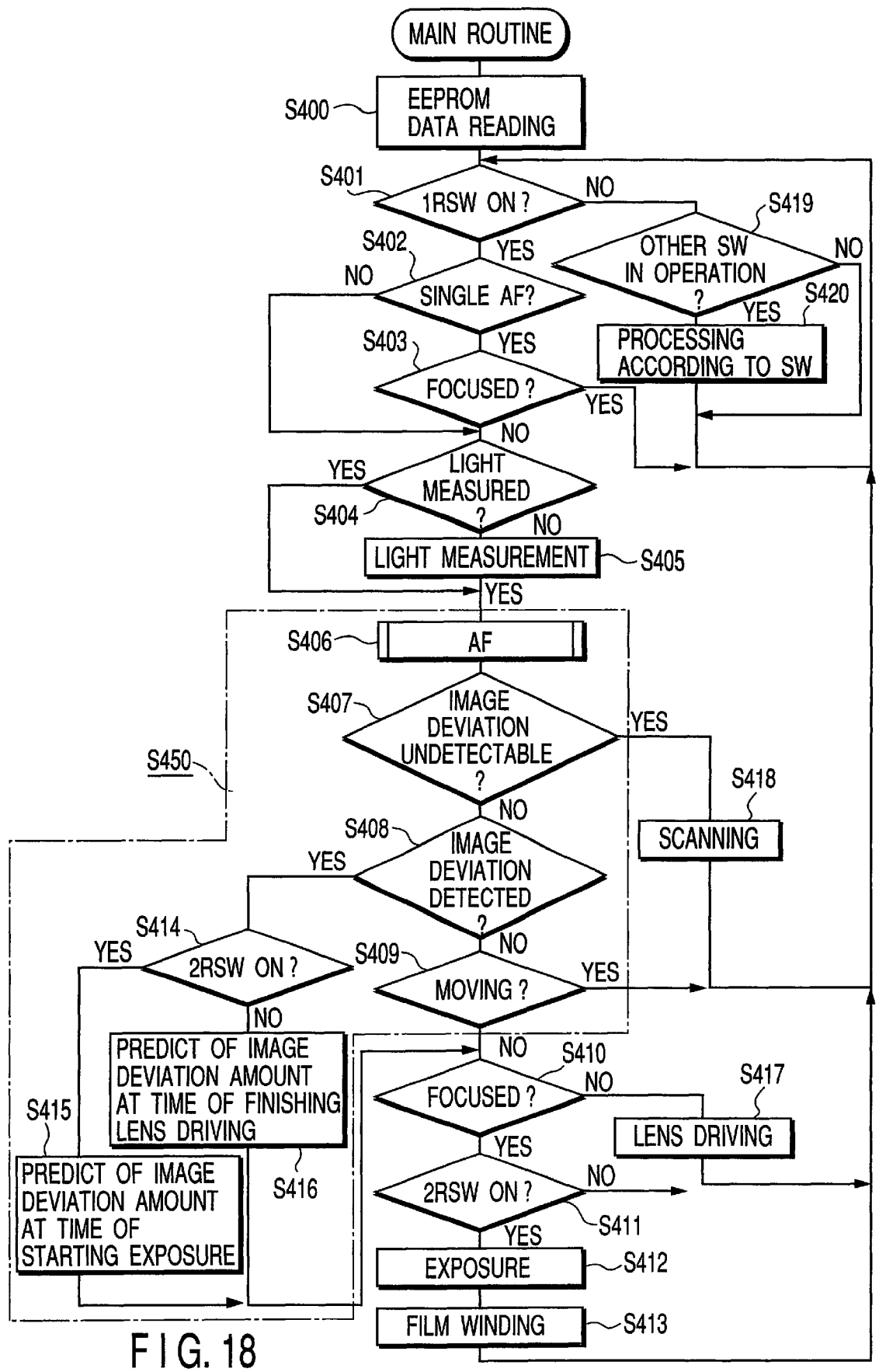
FIG. 18 is a flowchart for showing a main routine of a camera sequence.
Figure 19A:
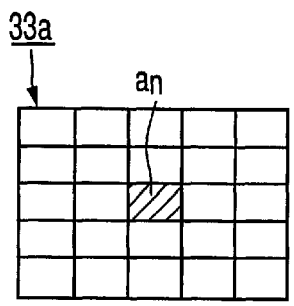
FIGS. 19A, 19B, 19C, 19D and 19E are explanatory views for showing a method of shifting an area at the time of detecting image move amounts of the subject in a second embodiment of the present invention.
Figure 19D:
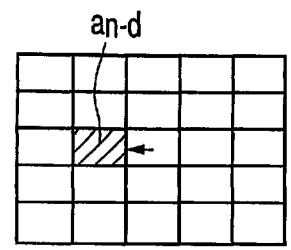
Figure 19B:
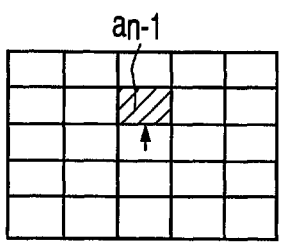
Figure 19E:
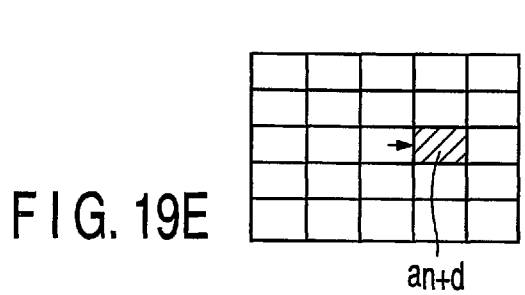
Figure 19C:
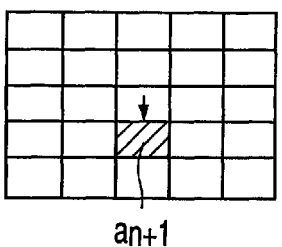

An outline of the operation of the camera (a camera sequence) to which the present invention has been applied will be explained based on a flowchart shown in FIG. 18.

This operation is a main routine for showing a control procedure of a program started by the controller 40 shown in FIG. 4.

When the main controller 40 has started its operation, the main routine shown in this flowchart is executed.

At first, there are read various correction data to be used in the AF processing and the AE processing stored in advance in the EEPROM 45. The read data are then extended in the RAM 42 (step S400).

At the next step S401, it is judged whether the 1RSW (first release switch) has been in an ON state or not. When the 1RSW is not in the ON state, the process proceeds to a step S419.

On the other hand, when the 1RSW is in the ON state, it is judged whether the AF operation mode is "single AF" or "continuous AF" (step S402).

When the single AF mode is the AF operation mode, the focusing is locked and the lens is not driven after the subject has been once focused. Therefore, the AF driving is not carried out if the subject has been once focused at the step S403.

When the single AF mode is not the operation mode at the step S402, the continuous AF mode is regarded as the operation mode. In this case, the AF driving is repeated following a change of the subject even after the subject has been once focused.

When the subject is not focused in the single AF mode, or when the continuous AF mode is the operation mode, the process proceeds to a step S404. At the step S404, when the light measurement has not been finished yet, the light measuring section 49 is operated in order to determine an exposure amount, thereby performing the measuring of the luminance of the subject (step S405).

At step S406, the above-described subroutine "AF detection" is executed.

As a result of the AF operation, it is judged whether it is possible to detect image deviation amounts or not by referring to the above-described image-undetectable flag.

When it is judged that it is possible to detect the image deviation amounts at the step S407, the process proceeds to step S408. At the step S408, it is judged whether a detection of the image move amounts has been finished or not.

On the other hand, when it is judged, at the step S407, that it is not possible to detect the image deviation amounts, a scanning operation is conducted to search the AF detectable lens position by driving the focus lens 22a.

When this scanning has been conducted, all the flags are cleared and the AF detection is started again from the beginning.

When move amounts of the images have been detected at the step S408, image deviation amounts are predicted at step S414.

That is, at the step S414, it is judged whether the 2RSW has been in an ON state or not. When the 2RSW has been in the ON state, image deviation amounts at the time of starting the exposure are predicted (step S415).

On the other hand, when the 2RSW has been in an OFF state, image deviation amounts at the time of finishing the lens driving are predicted as only the AF operation is conducted (step S416). Thereafter, the process proceeds to step S410.

When move amounts of the images have not been detected at the step S408, it is judged, at step S409, whether the subject is in the process of moving or not.

The image move-detected flag is cleared after the lens has been driven as described later. When the lens has been driven in the continuous AF mode, the image-moving flag is in the set state even if the image move amounts have not been detected. Thus, the process returns to the step S401, and the detection of image move amounts is started again.

On the other hand, when the subject is not moving, the process proceeds to step S410. At the step S410, the detected image deviation amounts or the predicted image deviation amounts are converted into defocus amounts. Then, it is judged whether the images are within an in-focus permissible range or not.

When it is judged, at the step S410, that the subject has not been focused, the process proceeds to step S417, and a necessary lens driving amount is obtained, and the focus lens is driven.

Within the lens driving routine, the image deviation-detected flag, the image deviation-undetectable flag and the image move-detected flag are cleared respectively, after the lens has been driven.

The flags are cleared in order to start the AF detection again from the beginning, as it is considered that the images change to a large degree after the focus lens has been once driven.

As described above, only the image-moving flag is not cleared in this case.

This flag is not cleared for continuously conducting the detection of moves of the images, so as not to avoid judging that the subject is in focus at the first AF detection after the lens has been driven in the continuous AF mode.

When it is judged, at the step S410, that the subject is in the focused state, the process proceeds to step S411, and the state of the 2RSW is judged.

When it is judged that the 2RSW is in the ON state, the diaphragm and the shutter are controlled based on the measured light value stored in the RAM 42, thereby conducting an exposure operation (step S412).

Then, the photographed film is wound up, to feed the frame to the next frame (step S413). Thus, a series of photographing operations are finished.

Further, at step S419, the states of other switches than the 1RSW and 2RSW are judged. When there is a switch that has been in an ON state, a processing according to this switch is executed (step S420). Thereafter, the process returns to the step S401.

As described above, according to the first embodiment of the present invention, positions of the images are detected both in the image-divided direction and in the direction approximately orthogonal with the image-divided direction on the area sensors. Accordingly, it is possible to detect image positions of a subject that moves in up and down directions, even if the camera has moved slightly from a set position by hand. Therefore, it is possible to control the predicting of image positions so that the subject can be focused accurately.

(Second Embodiment)

Next a second embodiment relating to an automatic focus adjusting apparatus of the present invention will be explained.

The structure of the apparatus of this embodiment is substantially equal to that of the first embodiment, and therefore its explanation will be omitted. A characteristic method of detecting a move amount of an image picked-up subject will be mainly explained.

FIGS. 19A, 19B, 19C, 19D and 19E are views corresponding to FIGS. 16A, 16B, 16C, 16D and 16E of the first embodiment. Particularly, an explanation will be made of a method of shifting the area an to detect move amounts of the images in the area 33a within the area sensor 33.

In the above-described first embodiment, the areas are shifted in up and down directions that are approximately orthogonal with the image-divided direction, with an emphasis on the influence of up- and down-moves of the subject. On the other hand, in the second embodiment, there is employed an area shifting method for shifting the area an shown in FIG. 19A in left and right directions. In other words, in the second embodiment, the area an is shifted in the image-divided direction to an area (an−d) and an area (an+d), as shown by arrows in FIGS. 19D and 19E. At the same time, the area is shifted in up and down directions to an area (an−1) and an area (an+1) as shown by arrows in FIGS. 19B and 19C.

Thus, it can be understood that when the area 33a and the area 33b divided to the left and right directions within the area sensor 33 are disposed in parallel in a lateral direction, the area an is also shifted in the image-divided direction, that is, in the longitudinal direction of the screen, or in left and right (horizontal) directions.

When the area an is shifted in up and down directions, the area an can be shifted in left and right directions. In other words, the area an can be shifted in oblique directions.

In this case, for the shift amount in a direction approximately orthogonal with the image-divided direction, the shift range is further reduced to prevent the calculation amount from increasing. Thus, it is possible to prevent the time lag from increasing due to the calculation.

Figure 20A:
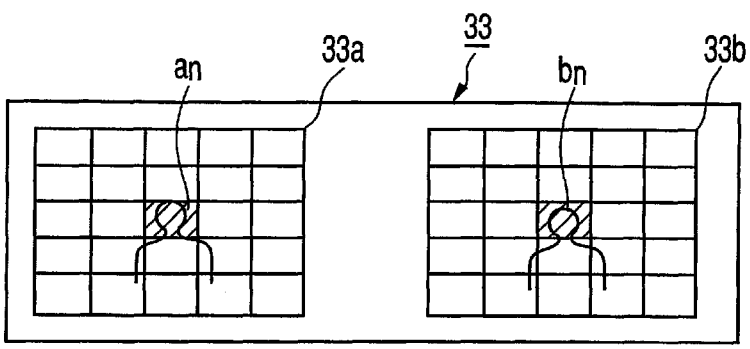
FIGS. 20A and 20B are explanatory views for showing a move of an image of the subject and a method of shifting an area corresponding to a move amount of this image at times t0 and t1 in the second embodiment of the present invention.
Figure 20B:
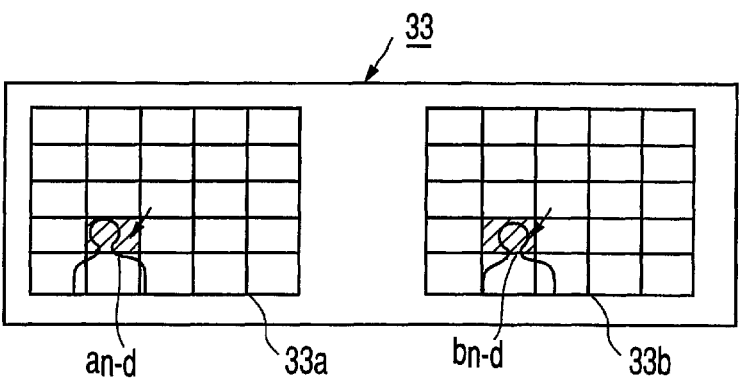

According to the second embodiment, with the above-described setting, the areas an and bn can be shifted to left and right directions, or in oblique directions to an area (an−d) and an area (bn−d), by shifting the areas an and bn in up and down directions, when the areas 33a and 33b divided in left and right directions in the area sensor 33 are disposed in parallel in a lateral direction, as shown in FIG. 20.

As described above, in the second embodiment, the areas are also shifted in the image-divided direction, that is, in the longitudinal direction of the screen, or in left and right (horizontal) directions. Therefore, it is possible to accurately detect images that move in complex directions, including both the image-dived direction (left and right directions) and the direction approximately orthogonal with the image-dived direction, in which directions it is not possible to detect the images according to the first embodiment.

(Modified Example 1)

Figure 23:
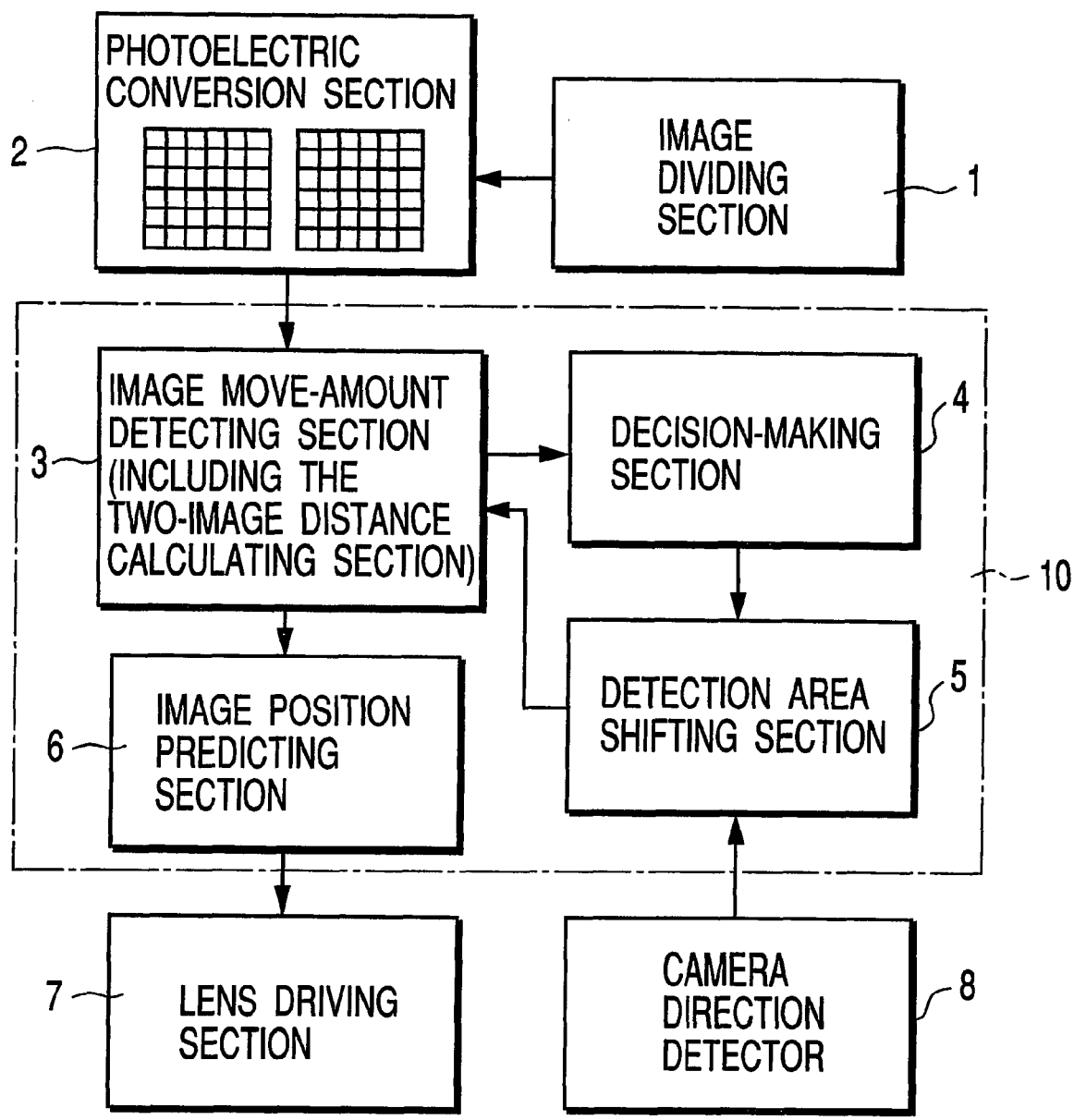
FIG. 23 is a block diagram for showing a basic structure of a modified example of the automatic focus adjusting apparatus according the present invention.

As one modified example of the above-described embodiments, there is provided, as shown in FIG. 23, a camera direction detector 8 in the camera body, for detecting a direction of the camera, for example, a vertical direction or a lateral direction, at the time of taking a picture, in addition to the elements shown in FIG. 1.

Based on a camera direction, such as, for example, a lateral direction or a vertical direction detected by the camera direction detector 8 at the time of taking a picture, it is possible to change the shift amounts in both the image-dived direction and a direction perpendicular to the image-divided direction.

In other words, as described above, when the camera body direction detected by the camera direction detector 8 is in a lateral direction, a shifting method similar to that of the first embodiment is employed.

When the camera body direction detected by the camera direction detector 8 is in a vertical direction, there is employed a shift method having shift sequence and directions changed as shown in FIGS. 21A, 21B, 21C, 21D and 21E.

Figure 21A:
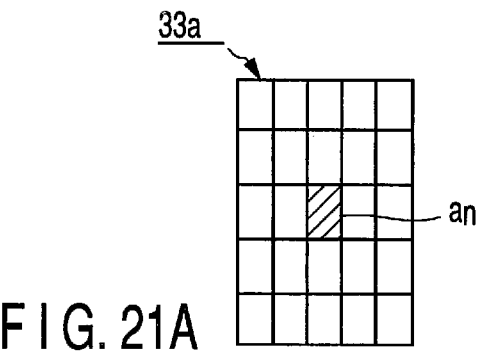
FIGS. 21A, 21B, 21C, 21D and 21E are explanatory views for showing a method of shifting an area when the area sensor is in a vertical array.
Figure 21D:
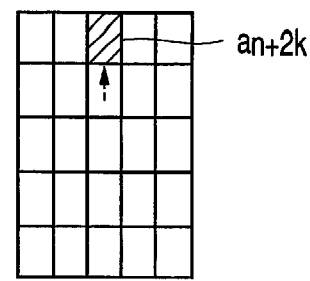
Figure 21B:
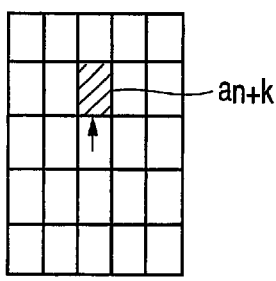
Figure 21E:
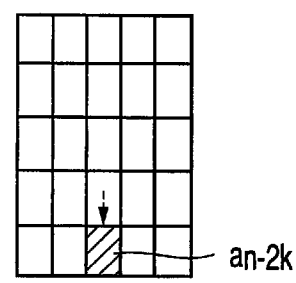
Figure 21C:
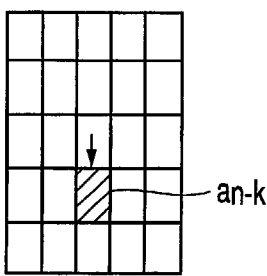

In FIGS. 21B and 21C, the area an in FIG. 21A is shifted by +k or −k. In FIGS. 21D and 21E, the area an is shifted by +2k or −2k (k=1, 2, . . . ).

Figure 22A:
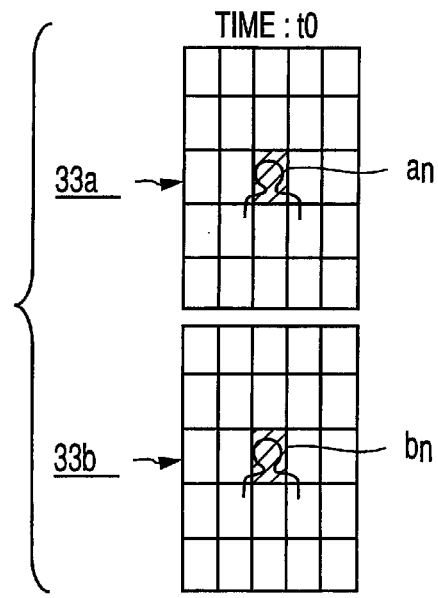
FIGS. 22A and 22B are explanatory views for showing a shifting method corresponding to up- and down-moves of an image of the subject.
Figure 22B:
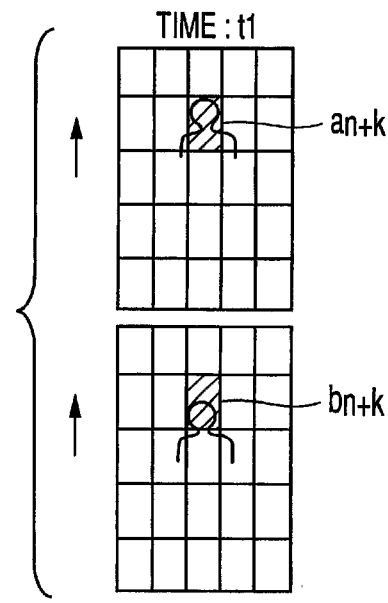

Image signals of a subject in this case can be obtained, for example, in areas (an+k) and (bn+k) which are the areas an and bn at the time t0 that have been shifted upward by +k respectively at the time t1, as shown in FIGS. 22A and 22B. Thus, it is possible to obtain signals more satisfactorily for images of the subject that moves in up and down directions.
(Modified Example 2)

In the above-described first and second embodiments, the automatic focus adjusting apparatus has been applied to the TTL phase difference detecting system. However, the automatic focus adjusting apparatus of the present invention can be similarly applied to an external optical system distance measuring apparatus.

Further, in the automatic focus adjusting apparatus of the present invention, it is also possible to detect a move amount of the camera due to a hand touch on the camera, based on the detected image move amounts. For example, it may be so arranged that an alarm display or a buzzer sound is generated when the camera move amount due to a hand touch on the camera is at or above a predetermined value.

In this case, up and down move components of the subject can be detected by obtaining a difference between the move amount of a main subject (for example, a human body) and the move amount of the background (surroundings) detected in other areas.

Accordingly, based on the above-described structure, it is possible to separate only a camera move amount due to a touch on the camera. Therefore, it is possible to accurately detect a camera move amount attributable to the hand touch.

As explained above, the present invention provides an automatic focus adjusting apparatus capable of securely focusing an image of a moving subject, by always detecting the same subject, through the detection of moves of images both in an image-dived direction and in a direction approximately orthogonal with the image-dived direction.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An automatic focus adjusting apparatus comprising:
image move-amount detecting means for detecting, for each of a pair of images of a subject divided in a predetermined direction, image positions of the subject in an image-divided direction and in a direction approximately orthogonal with this image-divided direction respectively on photoelectric conversion elements at mutually different first and second times respectively, and for obtaining move amounts of the images of the subject in the image-divided direction based on a result of this detection;

image position predicting means for predicting an image position of the subject in an image-divided direction at a third time different from the first and second times, based on an output from the image move-amount detecting means; and control means for carrying out a focus adjustment so that the image of the subject is in focus at the third time, based on an output from the image position predicting means.

2. An automatic focus adjusting apparatus comprising:
photoelectric conversion means having, in at least a predetermined area, a plurality of light receiving elements in a two-dimensional array for receiving light beams respectively of a pair of images of a subject formed by a pair of light beams arrayed in a predetermined direction, from out of light beams of the subject;

two-image distance calculating means for calculating a distance between the pair of images of the subject, based on an output of the pair of images from the photoelectric conversion means;

predicting means for predicting a distance between the two images at a third time, based on two-image distances at a first time and a second time respectively, by repeatedly operating the two-image distance calculating means, wherein the first time, the second time and third time are different from each other;

control means for outputting a lens driving signal based on an output from the predicting means, when a predicted value based on a calculation by the two-image distance calculating means does not meet a predetermined condition and also when the predicted value meets the predetermined condition as a result of carrying out a signal processing again by the two-image distance calculating means based on a signal from a changed light-receiving area positioned in a direction approximately orthogonal with the pair of light beams arrayed in the predetermined direction in the photoelectric conversion means; and Lens-driving means for driving an image pickup lens to focus the subject at the third time based on a lens-driving signal from the control means.

3. An automatic focus adjusting apparatus according to claim 2, wherein the photoelectric conversion means includes an area sensor having the plurality of light receiving elements arrayed in the predetermined area.

4. An automatic focus adjusting apparatus for adjusting a focus of an image pickup lens so as to focus an image of an image picked-up subject positioned in a detecting area in a predetermined longitudinal direction within a photographing screen, the automatic focus adjusting apparatus comprising:
predicting means for making a prediction by calculation based on a result of a repeated detection of a focus;

lens driving means for driving the image pickup lens based on a prediction so as to focus the subject at a certain point of time in future, according to a result of the predict calculation conducted by the predicting means; and control means for prohibiting the lens driving means from driving the image pickup lens based on a prediction when it is judged that there is a low level of reliability in the process of predict calculation by the predict calculating means, then for making the predict calculation means detect again the predict calculation by shifting the detection area to a direction approximately orthogonal with the longitudinal direction, and for making the lens driving means drive the image pickup lens when it is judged that there is a reasonable level of reliability in the focus detection.

5. An automatic focus adjusting apparatus according to claim 4, wherein the control means prohibits the lens driving means from driving the image pickup lens based on a prediction when it is judged that there is a low level of reliability in the process of predict calculation by the predict calculating means, then makes the predict calculation means detect again the predict calculation by shifting the detection area to an image-divided direction and to a direction approximately orthogonal with the imaged-dived direction, and makes the lens driving means drive the image pickup lens when it is judged that there is a reasonable level of reliability in the focus detection.

6. An automatic focus adjusting apparatus comprising:
image dividing means for dividing an image of an image picked-up subject into a pair of images;
first and second groups of photoelectric conversion elements for receiving respectively light beams of the pair of images divided by the image dividing means;
image move-amount detecting means for obtaining move amounts of images of the subject, for each of the pair of images divided by the image dividing means, based on image positions of the subject on the first and second groups of photoelectric conversion elements at mutually different first and second times;
detection area shifting means for shifting an image detection area of the subject detected by the image move-amount-detecting means, to a direction approximately orthogonal with a direction in which the image is divided;
image position predicting means for predicting positions of the images of the subject at a third time different from the first and second times, based on an output from the image move-amount detecting means; and
Lens-driving means for driving a lens based on an output from the image position predicting means.

7. An automatic focus adjusting apparatus according to claim 6, further comprising judging means for judging a detection state of the image move-amount detecting means and for making the detection area shifting means operate when it is judged that the image move-amount detecting means cannot detect an image move amount.

8. An automatic focus adjusting apparatus according to claim 6, wherein the detection area shifting means shifts an image detection area in the image-divided direction and in a direction approximately orthogonal with the image-divided direction.

9. An automatic focus adjusting apparatus according to claim 8, further comprising detecting means for detecting a direction of the disposition of a device main body on which the automatic focus adjusting apparatus is mounted, wherein the detection area shifting means shifts the image detection area based on an output from the detecting means.

10. An automatic focus adjusting apparatus comprising:
an image dividing section for dividing an image of an image picked-up subject into a pair of images;
first and second groups of photoelectric conversion elements for receiving respectively light beams of the pair of images divided by the image dividing section;
an image move-amount detecting section for obtaining a move of each of the pair of images of the subject divided by the image dividing section, based on image positions of the subject on the first and second groups of photoelectric conversion elements at mutually different first and second times;
a detection area shifting section for shifting an image detection area of the subject detected by the image move-amount detecting section, to a direction approximately orthogonal with a direction in which the image is divided;
an image position predicting section for predicting positions of the images of the subject at a third time different from the first and second times, based on an output from the image move-amount detecting section; and
a lens driving section for driving a lens based on an output from the image position predicting section.

11. An automatic focus adjusting apparatus according to claim 10, further comprising judging means for judging a detection state of the image move-amount detecting section and for making the detection area shifting section operate when it is judged that the image move-amount detecting section cannot detect image move amounts.

12. An automatic focus adjusting apparatus according to claim 10, wherein the detection area shifting section shifts an image detection area in the image-divided direction and in a direction approximately orthogonal with the image-divided direction.

13. An automatic focus adjusting apparatus according to claim 11, wherein the detection area shifting section shifts an image detection area in the image-divided direction and in a direction approximately orthogonal with the image-divided direction.

14. An automatic focus adjusting apparatus according to claim 13, further comprising detecting section for detecting a direction of the disposition of a device main body on which the automatic focus adjusting apparatus is mounted, wherein the detection area shifting section shifts the image detection area based on an output from the detecting section.

15. An automatic focus adjusting method comprising the steps of:
dividing an image of an image picked-up subject into a pair of images;
receiving light beams of the pair of divided images, by first and second groups of photoelectric conversion elements respectively;
obtaining a move amount of each of the pair of divided images of the subject, based on image positions of the subject on the first and second groups of photoelectric conversion elements at mutually different first and second times;
shifting an image detection area of the subject obtained in the step of obtaining image move amounts of the subject, to a direction approximately orthogonal with a direction in which the image is divided;
predicting positions of the images of the subject at a third time different from the first and second times, based on the image move amounts of the subject; and
driving a lens based on an output of the predicted image positions of the subject.

16. An automatic focus adjusting method according to claim 15, further comprising the step of judging a detection state of the step of detecting image move amounts and for shifting the detection area when it is judged that image move amounts cannot be detected.

17. An automatic focus adjusting method according to claim 15, wherein the step of shifting an image detection area is for shifting the image detection area in the image-divided direction and in a direction approximately orthogonal with the image-divided direction.

18. An automatic focus adjusting method according to claim 16, wherein the step of shifting an image detection area is for shifting the image detection area in the image-divided direction and in a direction approximately orthogonal with the image-divided direction.

19. An automatic focus adjusting method according to claim 17, further comprising the step of detecting a direction of the disposition of a device main body on which the automatic focus adjusting apparatus is mounted, wherein
the step of shifting the detection area is for shifting the image detection area based on an output of the detection of the disposition direction of the device main body.

* * * * *